United States Patent
Maxwell et al.

(10) Patent No.: US 10,217,092 B1
(45) Date of Patent: Feb. 26, 2019

(54) INTERACTIVE DIGITAL PLATFORM

(71) Applicant: Square, Inc., San Francisco, CA (US)

(72) Inventors: David W. Maxwell, San Francisco, CA (US); Lauren A. Myrick, San Francisco, CA (US); Tiffany Y. Ng, San Francisco, CA (US); Riley McElroy Strong, San Francisco, CA (US); Tyler James Lettau, Hercules, CA (US)

( * ) Notice: Subject to any disclaimer, the term of this patent is extended or adjusted under 35 U.S.C. 154(b) by 353 days.

(21) Appl. No.: 14/088,141

(22) Filed: Nov. 22, 2013

Related U.S. Application Data

(60) Provisional application No. 61/901,986, filed on Nov. 8, 2013.

(51) Int. Cl.
  *G06Q 20/04* (2012.01)
  *G06Q 30/02* (2012.01)
(52) U.S. Cl.
  CPC ..... *G06Q 20/0453* (2013.01); *G06Q 30/0234* (2013.01); *G06Q 30/0235* (2013.01)
(58) Field of Classification Search
  CPC .................................................. G06Q 30/0234
  USPC ....................................................... 705/14.34
  See application file for complete search history.

(56) References Cited

U.S. PATENT DOCUMENTS

| | | | |
|---|---|---|---|
| 5,315,093 A | 5/1994 | Stewart | |
| 5,590,038 A | 12/1996 | Pitroda | |
| 5,652,421 A | 7/1997 | Veeneman et al. | |
| 5,878,337 A | 3/1999 | Joao et al. | |
| 5,960,411 A | 9/1999 | Hartman et al. | |
| 6,026,387 A | 2/2000 | Kesel | |
| 6,154,738 A | 11/2000 | Call | |
| 6,175,922 B1 | 1/2001 | Wang | |
| 6,193,155 B1 | 2/2001 | Walker et al. | |

(Continued)

FOREIGN PATENT DOCUMENTS

| | | |
|---|---|---|
| AU | 2017235924 A1 | 10/2017 |
| AU | 2018205104 A1 | 7/2018 |

(Continued)

OTHER PUBLICATIONS

U.S. Appl. No. 14/513,076 of Borovsky, A., et al., filed Oct. 13, 2014.

(Continued)

*Primary Examiner* — Jamie R Kucab
(74) *Attorney, Agent, or Firm* — Lee & Hayes, PC

(57) ABSTRACT

A technique is disclosed for generating an interactive digital receipt on a user device, where the receipt offers an engagement platform for merchants and customers to interact on a continuous basis. The interactive digital receipt is generated in response to an occurrence of a particular financial transaction. The receipt includes a plurality of time-based interactive components to enable the merchant and the customer to interact with one another. The plurality of time-based interactive components includes a promotion component, a tipping component, a feedback component, and a loyalty rewards component. Each component is associated with a timeframe which defines a time period for which the customer may interact with the component. Content presented via each component changes corresponding to the time period. The time period can range from a limited time period to an unlimited time period.

20 Claims, 14 Drawing Sheets

(56) References Cited

U.S. PATENT DOCUMENTS

| | | |
|---|---|---|
| 6,263,352 B1 | 7/2001 | Cohen |
| 6,330,544 B1 | 12/2001 | Walker et al. |
| 6,341,353 B1 | 1/2002 | Herman et al. |
| 7,010,495 B1 | 3/2006 | Samra et al. |
| 7,085,812 B1 | 8/2006 | Sherwood |
| 7,136,448 B1 | 11/2006 | Venkataperumal et al. |
| 7,155,411 B1 | 12/2006 | Blinn et al. |
| 7,233,843 B2 | 6/2007 | Budhraja et al. |
| 7,406,436 B1 | 7/2008 | Reisman |
| 7,475,024 B1 | 1/2009 | Phan |
| 7,478,054 B1 | 1/2009 | Adams et al. |
| 7,493,390 B2 | 2/2009 | Bobde et al. |
| 7,552,087 B2 * | 6/2009 | Schultz .......... G06Q 20/0453 705/38 |
| 7,575,166 B2 | 8/2009 | McNamara |
| 7,580,873 B1 | 8/2009 | Silver et al. |
| 7,603,382 B2 | 10/2009 | Halt, Jr. |
| 7,764,185 B1 | 7/2010 | Manz et al. |
| D621,849 S | 8/2010 | Anzures et al. |
| 7,805,378 B2 | 9/2010 | Berardi et al. |
| 7,810,729 B2 | 10/2010 | Morley, Jr. |
| 7,818,809 B1 | 10/2010 | Sobel et al. |
| 8,060,259 B2 | 11/2011 | Budhraja et al. |
| 8,112,066 B2 | 2/2012 | Ben Ayed |
| 8,190,514 B2 | 5/2012 | Bishop et al. |
| 8,266,551 B2 | 9/2012 | Boldyrev et al. |
| 8,401,710 B2 | 3/2013 | Budhraja et al. |
| 8,423,459 B1 | 4/2013 | Green et al. |
| 8,434,682 B1 | 5/2013 | Argue et al. |
| D683,755 S | 6/2013 | Phelan |
| 8,459,544 B2 | 6/2013 | Casey et al. |
| 8,498,888 B1 | 7/2013 | Raff et al. |
| 8,571,916 B1 | 10/2013 | Bruce et al. |
| 8,577,803 B2 | 11/2013 | Chatterjee et al. |
| 8,577,810 B1 | 11/2013 | Dalit et al. |
| 8,579,203 B1 | 11/2013 | Lambeth et al. |
| D695,306 S | 12/2013 | Gabouer et al. |
| 8,602,296 B1 | 12/2013 | Velline et al. |
| 8,630,586 B2 | 1/2014 | Dvortsov et al. |
| 8,645,014 B1 | 2/2014 | Kozlowski et al. |
| 8,676,119 B2 | 3/2014 | Cohen et al. |
| 8,682,806 B1 | 3/2014 | Cate et al. |
| 8,694,357 B2 | 4/2014 | Ting et al. |
| 8,788,418 B2 | 7/2014 | Spodak et al. |
| 8,843,385 B2 | 9/2014 | Jurca et al. |
| 8,855,312 B1 | 10/2014 | Hodgman et al. |
| 8,859,337 B2 | 10/2014 | Gaul et al. |
| 8,892,462 B1 | 11/2014 | Borovsky et al. |
| D720,765 S | 1/2015 | Xie et al. |
| D720,766 S | 1/2015 | Mandal et al. |
| 8,939,357 B1 | 1/2015 | Perry |
| D725,133 S | 3/2015 | Smirin et al. |
| D725,666 S | 3/2015 | Tseng et al. |
| 8,972,298 B2 | 3/2015 | Kunz et al. |
| 9,010,644 B1 | 4/2015 | Workley |
| D732,059 S | 6/2015 | Andersen et al. |
| 9,064,249 B1 | 6/2015 | Borovsky et al. |
| 9,092,767 B1 | 7/2015 | Andrews et al. |
| 9,092,776 B2 | 7/2015 | Dessert |
| 9,092,828 B2 | 7/2015 | Hosp |
| 9,195,985 B2 | 11/2015 | Domenica et al. |
| D748,114 S | 1/2016 | Leyon |
| D752,604 S | 3/2016 | Zhang |
| D752,605 S | 3/2016 | Wang |
| D786,906 S | 5/2017 | Andersen et al. |
| 9,721,251 B1 | 8/2017 | Jen et al. |
| 9,799,021 B1 | 10/2017 | Lee |
| 10,026,062 B1 | 7/2018 | Sasmaz et al. |
| 2001/0054003 A1 | 12/2001 | Chien et al. |
| 2002/0091646 A1 | 7/2002 | Lake et al. |
| 2003/0014317 A1 | 1/2003 | Siegel et al. |
| 2003/0061157 A1 | 3/2003 | Hirka et al. |
| 2003/0065805 A1 | 4/2003 | Barnes, Jr. |
| 2003/0115126 A1 | 6/2003 | Pitroda |
| 2003/0115285 A1 | 6/2003 | Lee et al. |
| 2003/0204447 A1 | 10/2003 | Dalzell et al. |
| 2004/0030601 A1 | 2/2004 | Pond et al. |
| 2004/0103065 A1 | 5/2004 | Kishen et al. |
| 2004/0138999 A1 | 7/2004 | Friedman et al. |
| 2004/0193489 A1 | 9/2004 | Boyd et al. |
| 2004/0204990 A1 * | 10/2004 | Lee .......... G06Q 30/02 705/14.13 |
| 2004/0215520 A1 | 10/2004 | Butler et al. |
| 2004/0219971 A1 | 11/2004 | Ciancio et al. |
| 2005/0055582 A1 | 3/2005 | Bazakos et al. |
| 2005/0246245 A1 | 11/2005 | Satchell et al. |
| 2006/0064373 A1 | 3/2006 | Kelley |
| 2006/0085333 A1 | 4/2006 | Wah et al. |
| 2006/0131385 A1 | 6/2006 | Kim |
| 2006/0146839 A1 | 7/2006 | Hurwitz et al. |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0208930 A1 | 9/2007 | Blank et al. |
| 2007/0244766 A1 | 10/2007 | Goel |
| 2007/0255653 A1 | 11/2007 | Tumminaro et al. |
| 2007/0255662 A1 | 11/2007 | Tumminaro |
| 2008/0035725 A1 | 2/2008 | Jambunathan et al. |
| 2008/0037442 A1 | 2/2008 | Bill |
| 2008/0040265 A1 | 2/2008 | Rackley, III et al. |
| 2008/0052176 A1 | 2/2008 | Buchheit |
| 2008/0078831 A1 | 4/2008 | Johnson et al. |
| 2008/0133351 A1 | 6/2008 | White et al. |
| 2008/0177624 A9 * | 7/2008 | Dohse .......... G06Q 30/02 705/14.14 |
| 2008/0177826 A1 | 7/2008 | Pitroda |
| 2008/0197188 A1 | 8/2008 | Jagatic et al. |
| 2008/0262925 A1 | 10/2008 | Kim et al. |
| 2008/0270246 A1 | 10/2008 | Chen |
| 2008/0277465 A1 | 11/2008 | Pletz et al. |
| 2008/0296978 A1 | 12/2008 | Finkenzeller et al. |
| 2009/0070228 A1 | 3/2009 | Ronen |
| 2009/0099961 A1 | 4/2009 | Ogilvy |
| 2009/0106138 A1 | 4/2009 | Smith et al. |
| 2009/0112766 A1 | 4/2009 | Hammad et al. |
| 2009/0119190 A1 | 5/2009 | Realini |
| 2009/0159663 A1 | 6/2009 | Mullen et al. |
| 2009/0192904 A1 | 7/2009 | Patterson et al. |
| 2009/0204472 A1 | 8/2009 | Einhom |
| 2009/0240558 A1 | 9/2009 | Bandy et al. |
| 2009/0266884 A1 | 10/2009 | Killian et al. |
| 2009/0271265 A1 | 10/2009 | Lay et al. |
| 2009/0288012 A1 * | 11/2009 | Hertel .......... G06Q 20/02 715/738 |
| 2009/0313132 A1 | 12/2009 | McKenna et al. |
| 2009/0319421 A1 | 12/2009 | Mathis et al. |
| 2009/0319638 A1 | 12/2009 | Faith et al. |
| 2010/0010906 A1 | 1/2010 | Grecia |
| 2010/0076777 A1 | 3/2010 | Paretti et al. |
| 2010/0082420 A1 | 4/2010 | Trifiletti et al. |
| 2010/0102125 A1 | 4/2010 | Gatto |
| 2010/0125495 A1 | 5/2010 | Smith et al. |
| 2010/0174596 A1 | 7/2010 | Gilman et al. |
| 2010/0185514 A1 | 7/2010 | Glazer et al. |
| 2010/0223145 A1 | 9/2010 | Dragt |
| 2010/0269059 A1 | 10/2010 | Othmer et al. |
| 2010/0280896 A1 | 11/2010 | Postrel |
| 2010/0306099 A1 | 12/2010 | Hirson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 * | 4/2011 | Fordyce, III .......... G06Q 30/02 705/14.65 |
| 2011/0112897 A1 | 5/2011 | Tietzen et al. |
| 2011/0131128 A1 | 6/2011 | Vaananen |
| 2011/0145049 A1 | 6/2011 | Hertel et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251892 A1 | 10/2011 | Laracey |
| 2011/0251962 A1 | 10/2011 | Hruska |

(56) References Cited

U.S. PATENT DOCUMENTS

| | | | |
|---|---|---|---|
| 2011/0258014 A1 | 10/2011 | Evangelist et al. |
| 2011/0258689 A1 | 10/2011 | Cohen et al. |
| 2011/0270747 A1 | 11/2011 | Xu |
| 2011/0276418 A1 | 11/2011 | Velani |
| 2011/0295722 A1 | 12/2011 | Reisman |
| 2011/0295750 A1 | 12/2011 | Rammal |
| 2011/0302019 A1 | 12/2011 | Proctor, Jr. et al. |
| 2011/0302080 A1 | 12/2011 | White et al. |
| 2011/0313840 A1 | 12/2011 | Mason et al. |
| 2011/0313867 A9 | 12/2011 | Silver |
| 2011/0313871 A1 | 12/2011 | Greenwood |
| 2011/0320345 A1 | 12/2011 | Taveau et al. |
| 2012/0005076 A1 | 1/2012 | Dessert et al. |
| 2012/0011072 A1* | 1/2012 | Lodolo ............... G06Q 20/045 705/302 |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059718 A1 | 3/2012 | Ramer et al. |
| 2012/0059758 A1 | 3/2012 | Carlson |
| 2012/0066065 A1 | 3/2012 | Switzer |
| 2012/0084210 A1 | 4/2012 | Farahmand |
| 2012/0089418 A1 | 4/2012 | Kamath et al. |
| 2012/0095867 A1 | 4/2012 | McKelvey |
| 2012/0095871 A1 | 4/2012 | Dorsey et al. |
| 2012/0110568 A1 | 5/2012 | Abel et al. |
| 2012/0130785 A1 | 5/2012 | Postrel |
| 2012/0143772 A1 | 6/2012 | Abadir |
| 2012/0150611 A1* | 6/2012 | Isaacson ............... G06Q 30/02 705/14.27 |
| 2012/0150643 A1 | 6/2012 | Wolfe et al. |
| 2012/0150742 A1 | 6/2012 | Poon et al. |
| 2012/0166311 A1 | 6/2012 | Dwight et al. |
| 2012/0185306 A1 | 7/2012 | Cheng |
| 2012/0185355 A1 | 7/2012 | Kilroy |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0198279 A1 | 8/2012 | Schroeder |
| 2012/0209749 A1 | 8/2012 | Hammad et al. |
| 2012/0209773 A1 | 8/2012 | Ranganathan |
| 2012/0214416 A1 | 8/2012 | Kent et al. |
| 2012/0244885 A1 | 9/2012 | Hefetz |
| 2012/0254031 A1 | 10/2012 | Walker et al. |
| 2012/0271707 A1 | 10/2012 | Harrison et al. |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1* | 11/2012 | Bhinder ............... G06Q 20/20 705/21 |
| 2012/0290609 A1 | 11/2012 | Britt |
| 2012/0296679 A1 | 11/2012 | Im |
| 2012/0296726 A1 | 11/2012 | Dessert et al. |
| 2012/0323685 A1 | 12/2012 | Ullah |
| 2013/0006773 A1 | 1/2013 | Lutnick et al. |
| 2013/0019284 A1 | 1/2013 | Pacyga et al. |
| 2013/0024341 A1 | 1/2013 | Jeon et al. |
| 2013/0024364 A1 | 1/2013 | Shrivastava et al. |
| 2013/0024371 A1 | 1/2013 | Hariramani et al. |
| 2013/0030889 A1 | 1/2013 | Davich et al. |
| 2013/0036065 A1 | 2/2013 | Chen et al. |
| 2013/0041824 A1 | 2/2013 | Gupta |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1* | 3/2013 | Boal ............... G06Q 30/06 705/14.23 |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132140 A1 | 5/2013 | Amin et al. |
| 2013/0132182 A1 | 5/2013 | Fung et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0134962 A1 | 5/2013 | Kamel et al. |
| 2013/0138563 A1 | 5/2013 | Gilder et al. |
| 2013/0144707 A1 | 6/2013 | Issacson et al. |
| 2013/0151613 A1 | 6/2013 | Dhawan et al. |
| 2013/0159081 A1 | 6/2013 | Shastry et al. |
| 2013/0159172 A1 | 6/2013 | Kim |
| 2013/0159173 A1 | 6/2013 | Sivaraman et al. |
| 2013/0159446 A1 | 6/2013 | Carlson et al. |
| 2013/0166402 A1 | 6/2013 | Parento et al. |
| 2013/0166445 A1 | 6/2013 | Issacson et al. |
| 2013/0173407 A1 | 7/2013 | Killian et al. |
| 2013/0179227 A1 | 7/2013 | Booth et al. |
| 2013/0181045 A1 | 7/2013 | Dessert et al. |
| 2013/0198018 A1 | 8/2013 | Baig |
| 2013/0204727 A1 | 8/2013 | Rothschild |
| 2013/0204777 A1 | 8/2013 | Irwin, Jr. et al. |
| 2013/0204793 A1 | 8/2013 | Kerridge et al. |
| 2013/0218697 A1 | 8/2013 | Kingston et al. |
| 2013/0218721 A1* | 8/2013 | Borhan ............... G06Q 20/322 705/26.41 |
| 2013/0225081 A1 | 8/2013 | Doss et al. |
| 2013/0228616 A1 | 9/2013 | Bhosle et al. |
| 2013/0236109 A1 | 9/2013 | Madden et al. |
| 2013/0246203 A1 | 9/2013 | Laracey |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0248591 A1 | 9/2013 | Look et al. |
| 2013/0268431 A1 | 10/2013 | Mohsenzadeh |
| 2013/0290173 A1* | 10/2013 | Nemeroff ............... G06Q 20/26 705/39 |
| 2013/0290522 A1 | 10/2013 | Behm, Jr. |
| 2013/0291018 A1 | 10/2013 | Billings et al. |
| 2013/0295882 A1 | 11/2013 | Zhao |
| 2013/0297933 A1 | 11/2013 | Fiducia et al. |
| 2013/0317835 A1 | 11/2013 | Mathew |
| 2013/0317950 A1 | 11/2013 | Abraham et al. |
| 2013/0332354 A1 | 12/2013 | Rhee et al. |
| 2013/0332385 A1 | 12/2013 | Kilroy et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0019236 A1* | 1/2014 | Argue ............... G06Q 30/02 705/14.51 |
| 2014/0025446 A1 | 1/2014 | Nagarajan et al. |
| 2014/0032297 A1 | 1/2014 | Germann et al. |
| 2014/0052613 A1 | 2/2014 | Tavakoli et al. |
| 2014/0052617 A1 | 2/2014 | Chawla et al. |
| 2014/0057667 A1 | 2/2014 | Blankenship et al. |
| 2014/0058861 A1 | 2/2014 | Argue et al. |
| 2014/0059466 A1 | 2/2014 | Mairs et al. |
| 2014/0067557 A1 | 3/2014 | van Niekerk et al. |
| 2014/0074569 A1 | 3/2014 | Francis et al. |
| 2014/0074655 A1 | 3/2014 | Lim et al. |
| 2014/0074658 A1 | 3/2014 | Sanchez |
| 2014/0074691 A1 | 3/2014 | Bank et al. |
| 2014/0074716 A1 | 3/2014 | Ni |
| 2014/0081783 A1 | 3/2014 | Paranjape et al. |
| 2014/0081853 A1 | 3/2014 | Sanchez et al. |
| 2014/0081854 A1 | 3/2014 | Sanchez et al. |
| 2014/0084059 A1 | 3/2014 | Sierchio et al. |
| 2014/0089073 A1 | 3/2014 | Jacobs et al. |
| 2014/0089078 A1 | 3/2014 | Dessert et al. |
| 2014/0096179 A1 | 4/2014 | Ben-Shalom et al. |
| 2014/0099888 A1 | 4/2014 | Flanagan et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0108245 A1 | 4/2014 | Drummond et al. |
| 2014/0114775 A1 | 4/2014 | Cloin et al. |
| 2014/0114781 A1 | 4/2014 | Watanabe |
| 2014/0122345 A1* | 5/2014 | Argue ............... G06Q 30/04 705/304 |
| 2014/0129135 A1 | 5/2014 | Holden et al. |

(56) References Cited

U.S. PATENT DOCUMENTS

| | | |
|---|---|---|
| 2014/0129302 A1 | 5/2014 | Amin et al. |
| 2014/0129357 A1 | 5/2014 | Goodwin |
| 2014/0129942 A1 | 5/2014 | Rathod |
| 2014/0129951 A1 | 5/2014 | Amin et al. |
| 2014/0136318 A1 | 5/2014 | Alberth, Jr. et al. |
| 2014/0136349 A1 | 5/2014 | Dave et al. |
| 2014/0143157 A1 | 5/2014 | Jeffs et al. |
| 2014/0149282 A1 | 5/2014 | Philliou et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0180805 A1* | 6/2014 | Argue ............... G06Q 30/0241 705/14.53 |
| 2014/0184505 A1 | 7/2014 | Fullerton et al. |
| 2014/0201067 A1 | 7/2014 | Lai et al. |
| 2014/0207669 A1 | 7/2014 | Rosenberg |
| 2014/0214567 A1 | 7/2014 | Llach et al. |
| 2014/0214652 A1 | 7/2014 | Zheng et al. |
| 2014/0236762 A1 | 8/2014 | Gerber et al. |
| 2014/0244489 A1 | 8/2014 | Kessler et al. |
| 2014/0249947 A1 | 9/2014 | Hicks et al. |
| 2014/0250002 A1 | 9/2014 | Issacson et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279098 A1 | 9/2014 | Ham |
| 2014/0279184 A1 | 9/2014 | Lai et al. |
| 2014/0344102 A1 | 11/2014 | Cooper |
| 2014/0351004 A1 | 11/2014 | Flett |
| 2014/0379497 A1 | 12/2014 | Varma et al. |
| 2014/0379536 A1 | 12/2014 | Varma et al. |
| 2014/0379580 A1 | 12/2014 | Varma et al. |
| 2015/0012426 A1 | 1/2015 | Purves et al. |
| 2015/0025983 A1 | 1/2015 | Cicerchi |
| 2015/0032567 A1 | 1/2015 | Bhatia |
| 2015/0058146 A1 | 2/2015 | Gaddam et al. |
| 2015/0066699 A1 | 3/2015 | Fisher |
| 2015/0066765 A1 | 3/2015 | Banks et al. |
| 2015/0073907 A1 | 3/2015 | Purves et al. |
| 2015/0095134 A1 | 4/2015 | Parker et al. |
| 2015/0095228 A1 | 4/2015 | Su et al. |
| 2015/0100481 A1 | 4/2015 | Ghosh et al. |
| 2015/0112838 A1 | 4/2015 | Li et al. |
| 2015/0120418 A1 | 4/2015 | Cervenka et al. |
| 2015/0134513 A1 | 5/2015 | Olson et al. |
| 2015/0134528 A1 | 5/2015 | Fineman et al. |
| 2015/0178755 A1 | 6/2015 | Barroso |
| 2015/0194023 A1 | 7/2015 | Brackenridge et al. |
| 2015/0294312 A1 | 10/2015 | Kendrick et al. |
| 2015/0304270 A1 | 10/2015 | Cook |
| 2016/0086166 A1 | 3/2016 | Pomeroy et al. |
| 2018/0150807 A1 | 5/2018 | Aaron et al. |

FOREIGN PATENT DOCUMENTS

| | | |
|---|---|---|
| CA | 2 916 603 A1 | 12/2014 |
| CA | 2 930 186 A1 | 5/2015 |
| GB | 2530451 A | 3/2016 |
| KR | 10-2006-0103089 A | 9/2006 |
| WO | 2014/210020 A1 | 12/2014 |
| WO | 2015/061005 A1 | 4/2015 |
| WO | 2015/069389 A1 | 5/2015 |
| WO | 2015/100378 A1 | 7/2015 |
| WO | 2015/179316 A1 | 11/2015 |

OTHER PUBLICATIONS

U.S. Appl. No. 14/526,361 of White, M.W., et al., filed Oct. 28, 2014.
Advisory Action dated Nov. 18, 2014, U.S. Appl. No. 14/160,490 of Moring, D., et al., filed Jan. 21, 2014.
International search report and written opinion for PCT Application No. PCT/US2014/058398 dated Dec. 24, 2014.
Non-Final Office Action dated Jan. 9, 2015, U.S. Appl. No. 14/145,895 of Aaron, P., et al., filed Dec. 31, 2013.
International search report and written opinion for PCT Application No. PCT/US2014/058447 dated Jan. 15, 2015.
Final Office Action dated Jan. 26, 2015, U.S. Appl. No. 13/837,562, of Chin, H.C.A., et al., filed Mar. 15, 2013.
Notice of Allowance dated Feb. 20, 2015, U.S. Appl. No. 14/513,076, of Borovsky, A., et al., filed Oct. 13, 2014.
Final Office Action dated Mar. 17, 2015, U.S. Appl. No. 14/165,256, of Aaron, P., filed Jan. 27, 2014.
International search report and written opinion for PCT Application No. PCT/US2014/072269 dated Mar. 31, 2015.
Restriction Requirement dated Apr. 9, 2015, U.S. Appl. No. 14/225,338 of Aaron, P., et al., filed Mar. 25, 2014.
U.S. Appl. No. 14/692,655 of Borovsky, A., et al., filed Apr. 21, 2015.
Non-Final Office Action dated Apr. 27, 2015, U.S. Appl. No. 14/184,503 of Borovsky, A., et al., filed Feb. 19, 2014.
U.S. Appl. No. 14/149,754 of Spindel, N., et al. filed Jan. 7, 2014.
U.S. Appl. No. 14/208,800 of Thome, J.P. et al., filed Mar. 13, 2014.
U.S. Appl. No. 14/225,338 of Aaron, P. et al., filed Mar. 25, 2014.
Non-Final Office Action dated Apr. 4, 2014, U.S. Appl. No. 14/172,842 of Borovsky, A. et al., filed Feb. 4, 2014.
Non-Final Office Action dated Apr. 10, 2014, U.S. Appl. No. 14/160,490 of Morig, D., et al., filed Jan. 21, 2014.
Restriction Requirement dated Apr. 28, 2014, U.S. Appl. No. 14/165,256 of Aaron, P., filed Jan. 27, 2014.
Non-Final Office Action dated Apr. 8, 2016, for U.S. Appl. No. 14/526,361, of White, M. W., et al., filed Oct. 28, 2014.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Final Office Action dated Apr. 28, 2016, for U.S. Appl. No. 14/189,880, of Aaron, P., et al., filed Feb. 25, 2014.
Non-Final Office Action dated May 3, 2016, for U.S. Appl. No. 13/830,350, of Morgan, T. B., et al., filed Mar. 14, 2013.
Non-Final Office Action dated May 9, 2016, for U.S. Appl. No. 14/225,338, of Aaron, P., et al., filed Mar. 25, 2013.
"Another EBay Band-Aid Fails to Fix the New Pricing Structure Flaws," dated Oct. 18, 2008, Retrieved from the Internet URL: https://thebrewsnews.wordpress.com/2008/10/18/another-ebay-band-aid-fails-to-fix-the-new-pricing-structure-flaws/, pp. 1-5.
"Online Shopping," dated Nov. 2, 2014, Retrieved from the Internet URL: http://en.wikipedia.org/wiki/Online_shopping, on Nov. 10, 2014, pp. 1-12.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
U.S. Appl. No. 13/829,080, of Morgan, T.B., et al., filed Mar. 14, 2013.
U.S. Appl. No. 13/829,658, of Morgan, T.B., et al., filed Mar. 14, 2013.
U.S. Appl. No. 14/197,704, of Lamba, K., et al., filed Mar. 5, 2014.
U.S. Appl. No. 14/329,638, of Aaron, P., et al., filed Jul. 11, 2014.
U.S. Appl. No. 14/329,658, of Aaron, P., et al., filed Jul. 11, 2014.
U.S. Appl. No. 14/730,860, of Sasmaz, Y., et al., filed Jun. 4, 2015.
Non-Final Office Action dated Mar. 19, 2015, for U.S. Appl. No. 14/329,638, of Aaron, P., et al., filed Jul. 11, 2014.
Non-Final Office Action dated May 12, 2015, for U.S. Appl. No. 14/189,869, of Lamba, K., et al., filed Feb. 25, 2014.
Non-Final Office Action dated May 20, 2015, for U.S. Appl. No. 13/829,080, of Morgan, T.B., et al., filed Mar. 14, 2013.

(56) References Cited

OTHER PUBLICATIONS

Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jun. 11, 2015, for U.S. Appl. No. 14/692,655, of Borovsky, A., et al., filed Apr. 21, 2015.
Restriction Requirement dated Jun. 19, 2015, for U.S. Appl. No. 14/329,658, of Aaron, P., et al., filed Jul. 11, 2014.
Non-Final Office Action dated Jul. 2, 2015, for U.S. Appl. No. 14/208,800, of Thome, J.P., et al., filed Mar. 13, 2014.
Non-Final Office Action dated Jul. 10, 2015, for U.S. Appl. No. 14/526,361, of White, M.W., et al., filed Oct. 28, 2014.
Restriction Requirement dated Jul. 24, 2015, for U.S. Appl. No. 14/182,655, of Spindel, N., et al., filed Feb. 18, 2014.
Final Office Action dated Aug. 18, 2015, for U.S. Appl. No. 14/145,895, of Aaron, P., et al., filed Dec. 31, 2013.
International Search Report and Written Opinion for PCT Application No. PCT/US2015/031423 dated Aug. 13, 2015.
Final Office Action dated Aug. 28, 2014, U.S. Appl. No. 14/160,490 of Morig, D., et al., filed Jan. 21, 2014.
Non-Final Office Action dated Aug. 27, 2014, U.S. Appl. No. 14/165,256 of Aaron, P., filed Jan. 27, 2014.
Non-Final Office Action dated May 29, 2014, U.S. Appl. No. 13/837,562 of Chin, H.C.A. et al., filed Mar. 15, 2013.
Notice of Allowance dated Aug. 1, 2014, U.S. Appl. No. 14/172,842 of Borovsky, A. et al., filed Feb. 4, 2014.
"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K, et al., filed Mar. 5, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Final Office Action dated Oct. 5, 2015, for U.S. Appl. No. 14/526,361, of White, M.W., et al., filed Oct. 28, 2014.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Non-Final Office Action dated Oct. 8, 2015, for U.S. Appl. No. 14/149,754, of Spindel, N., et al., filed Jan. 7, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al., filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
Co-Pending U.S. Appl. No. 13/830,350 by Morgan, T.B. et al., filed Mar. 14, 2013.
Co-Pending U.S. Appl. No. 13/837,562 by Chin, H.C.A. et al., filed Mar. 15, 2013.
Co-Pending U.S. Appl. No. 14/088,113 by Maxwell, D.W. et al., filed Nov. 22, 2013.
Co-Pending U.S. Appl. No. 14/145,895 by Aaron, P., filed Dec. 31, 2013.
Co-Pending U.S. Appl. No. 14/160,490 by Morig, D., et al., filed Jan. 21, 2014.
Co-Pending U.S. Appl. No. 14/165,256 by Aaron, P., filed Jan. 27, 2014.
Co-Pending U.S. Appl. No. 14/168,274 by Odawa, A. et al., filed Jan. 30, 2014.
Co-Pending U.S. Appl. No. 14/172,842 by Borovsky, A. et al., filed Feb. 25, 2014.
Co-Pending U.S. Appl. No. 14/182,655 by Spindel, N., filed Feb. 18, 2014.
Co-Pending U.S. Appl. No. 14/184,503 by Borovsky, A., filed Feb. 19, 2014.
Co-Pending U.S. Appl. No. 14/189,869 by Lamba, K. et al., filed Feb. 25, 2014.
Co-Pending U.S. Appl. No. 14/189,880 by Aaron, P. et al., filed Feb. 25, 2014.
"Merchantindustry.com—Best Merchant Services," retrieved from internet URL: https://web.archive.org/web/20121020212419/http://www.merchantindustry.com/, on Dec. 30, 2015, pp. 1-7.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thome, J. P., et al., filed Mar. 13, 2014.
Advisory Action dated Dec. 31, 2015, for U.S. Appl. No. 14/225,338, of Aaron, P., et al., filed Mar. 25, 2014.
Advisory Action dated Jan. 21, 2016, for U.S. Appl. No. 14/526,361, of White, M. W., et al., filed Oct. 28, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T, B., et al., filed Mar. 14, 2013.
Non-Final Office Action dated Mar. 14, 2016, for U.S. Appl. No. 14/692,655, of Borovsky, A., et al., filed Apr. 21, 2015.
Restriction Requirement dated Mar. 16, 2016, for U.S. Appl. No. 14/088,113, of Maxwell, D. W., et al., filed Nov. 22, 2013.
Non-Final Office Action dated Mar. 24, 2016, for U.S. Appl. No. 14/145,895, of Aaron, P., et al., filed Dec. 31, 2013.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Sep. 22, 2016, for U.S. Appl. No. 14/182,655, of Spindel, N., et al., filed Feb. 18, 2014.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K., et al., filed Feb. 25, 2014.
Final Office Action dated Oct. 12, 2016, for U.S. Appl. No. 14/145,895, of Aaron, P., et al., filed Dec. 31, 2013.
Final Office Action dated Nov. 1, 2016, for U.S. Appl. No. 14/160,490, of Moring, D., et al., filed Jan. 21, 2014.
Notice of Allowance dated Nov. 8, 2016, for U.S. Appl. No. 14/225,338, of Aaron, P., et al., filed Mar. 25, 2014.
Shalmanese, "The Straight Dope Message Board," message dated Oct. 5, 2013, Retrieved from the internet URL: http://boards.straightdope.com/sdmb/showthread.php?t=703989%BB, on Jul. 18, 2016, pp. 1-10.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D. W., et al., filed Nov. 22, 2013.
Non-Final Office Action dated Jun. 7, 2016, for U.S. Appl. No. 14/208,800, of Thome, J. P., et al., filed Mar. 13, 2014.
Non-Final Office Action dated Jun. 17, 2016, for U.S. Appl. No. 14/184,503, of Borovsky, A., et al., filed Feb. 19, 2014.

(56) References Cited

OTHER PUBLICATIONS

Final Office Action dated Jun. 17, 2016, for U.S. Appl. No. 14/149,754, of Spindel, N., et al., filed Jan. 7, 2014.
Final Office Action dated Jun. 20, 2016, for U.S. Appl. No. 13/829,658, of Morgan, T. B., et al., filed Mar. 14, 2013.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., et al., filed Feb. 25, 2014.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Verified by Visa Acquirer and Merchant Implementation Guide," U.S. Region, Visa Public, May 2011, pp. 1-114.
"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.
Punch, L., "E-commerce: Just what does card-present mean these days," dated Oct. 1, 2012, Retrieved from be Internet URL: http://digitaltransactions.net/news/ story/ E-Commerce_-Just-What-Does-Card-Present-Mean-These-Days, on Feb. 17, 2015, pp. 1-4.
Non-Final Office Action dated Dec. 1, 2014, for U.S. Appl. No. 14/062,617, of Templeton, T., et al., filed Oct. 24, 2013.
Non Final Office Action dated Dec. 15, 2014, for U.S. Appl. No. 14/312,397, of Varma, A.K., et al., filed Jun. 23, 2014.
Final Office Action dated Apr. 16, 2015, for U.S. Appl. No. 14/062,617, of Templeton, T., et al., filed Oct. 24, 2013.
Final Office Action dated Aug. 31, 2015, for U.S. Appl. No. 14/312,397, of Varma, A.K., et al., filed Jun. 23, 2014.
Non-Final Office Action dated Jan. 14, 2016, for U.S. Appl. No. 14/312,397, of Varma, A.K., et al., filed Jun. 23, 2014.
Non-Final Office Action dated Feb. 23, 2016, for U.S. Appl. No. 14/062,617, of Templeton, T., et al., filed Oct. 24, 2013.
Non-Final Office Action dated May 5, 2016, for U.S. Appl. No. 14/312,397, of Varma, A.K., et al., filed Jun. 23, 2014.
Non-Final Office Action dated Aug. 10, 2016, for U.S. Appl. No. 14/312,433, of Varma, A.K., et al., filed Jun. 23, 2014.
Final Office Action dated Sep. 1, 2016, for U.S. Appl. No. 14/062,617, of Templeton, T., et al., filed Oct. 24, 2013.
Non-Final Office Action dated Sep. 8, 2016, for U.S. Appl. No. 14/312,371, of Varma, A.K., et al., filed Jun. 23, 2014.
Examination Report No. 1 for Australian Patent Application No. 2014302661, dated Sep. 27, 2016.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 28, 2016, for U.S. Appl. No. 14/312,397, of Varma, A.K., et al., filed Jun. 23, 2014.
Examiner's Requisition for Canadian Patent Application No. 2,916,603, dated Feb. 9, 2017.
Notice of Allowance dated Mar. 23, 2017, for U.S. Appl. No. 14/701,571, of Jen, M., et al., filed May 1, 2015.
Advisory Action dated Apr. 10, 2017, for U.S. Appl. No. 14/312,397, of Varma, A.K., et al., filed Jun. 23, 2014.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.

Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/043891, dated Dec. 10, 2014.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 13, 2017, for U.S. Appl. No. 14/312,397, of Varma, A.K., et al., filed Jun. 23, 2014.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.
Non-Final Office Action dated Jan. 20, 2017, for U.S. Appl. No. 14/168,274, of Odawa, A.W., et al., filed Jan. 30, 2014.
Examiner Requisition for Canadian Patent Application No. 2,930,186, dated Jan. 30, 2017.
Notice of Acceptance for Australian Patent Application No. 2014347192, dated Feb. 16, 2017.
Advisory Action dated Feb. 24, 2017, for U.S. Appl. No. 14/526,361, of White, M.W., et al., filed Oct. 28, 2014.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Non-Final Office Action dated Mar. 15, 2017, for U.S. Appl. No. 13/829,658, of Morgan, T.B., et al., filed Mar. 14, 2013.
Final Office Action dated Nov. 10, 2016, for U.S. Appl. No. 13/830,350, of Morgan, T.B., et al., filed Mar. 14, 2013.
Final Office Action dated Nov. 14, 2016, for U.S. Appl. No. 14/526,361, of White, M.W., et al., filed Oct. 28, 2014.
Final Office Action dated Nov. 29, 2016, for U.S. Appl. No. 14/088,113, of Maxwell, D.W., et al., filed Nov. 22, 2013.
Final Office Action dated Nov. 30, 2016, for U.S. Appl. No. 14/208,800, of Thome, J.P., et al., filed Mar. 13, 2014.
Advisory Action dated Dec. 22, 2016, for U.S. Appl. No. 14/145,895, of Aaron, P., et al., filed Dec. 31, 2013.
Final Office Action dated Dec. 27, 2016, for U.S. Appl. No. 14/184,503, of Borovsky, A., et al., filed Feb. 19, 2014.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examination Report No. 1 for Australian Patent Application No. 2014347192, dated Dec. 15, 2016.

(56) References Cited

OTHER PUBLICATIONS

Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.

Bruene, J., "Capital One Add Rewards to Mobile App, Includes Ability to Redeem from Previous Travel," netbanker.com, published Apr. 20, 2012, Retrieved from the Internet URL: https://web.archive.org/web/20120425043052/http://www.netbanker.com/2012/04/capital_one_add_rewards_to_mobile_app_includes_ability_to_redeem_for_previous_travel.html, on Aug. 10, 2018, pp. 1-2.

Joy, "Square Wallet—an iOS App updated to send gift cards," Top Apps, dated Apr. 6, 2013, Retrieved from the Internet URL: http://www.topapps.net/apple-ios/square-wallet-an-ios-app-updated-to-send-gift-cards.html/, pp. 1-3.

Konrad, J., "A Traveler's Review of the Capital One Venture Rewards Card," Runaway truck, dated on Jul. 11, 2013, Retrieved from the Internet URL: http://web.archive.org/web/20130923122057/http://queenofsubtle.com/rt/travel-tips/a-travelers-review-of-the-capital-one-venture-rewards-card, pp. 1-2.

Non-Final Office Action dated Apr. 4, 2014, for U.S. Appl. No. 14/172,842, of Borovsky, A., et al., filed Feb. 4, 2014.

Notice of Allowance dated Aug. 1, 2014, for U.S. Appl. No. 14/172,842, of Borovsky, A., et al., filed Feb. 4, 2014.

Non-Final Office Action dated Mar. 3, 2015, for U.S. Appl. No. 14/506,534, of Aaron, P., et al., filed Oct. 3, 2014.

Final Office Action dated Jun. 24, 2015, for U.S. Appl. No. 14/506,534, of Aaron, P., et al., filed Oct. 3, 2014.

Non-Final Office Action dated Apr. 8, 2016, for U.S. Appl. No. 14/187,104, of Lee, R., filed Feb. 21, 2014.

Non-Final Office Action dated May 17, 2016, for U.S. Appl. No. 29/530,241, of Andersen, R., et al., filed Jun. 15, 2015.

Final Office Action dated Oct. 5, 2016, for Design U.S. Appl. No. 29/530,241, of Andersen, R., et al., filed Jun. 15, 2015.

Non-Final Office Action dated Dec. 7, 2016, for U.S. Appl. No. 14/187,104, of Lee, R., filed Feb. 21, 2014.

Notice of Allowance dated Jan. 3, 2017, for Design U.S. Appl. No. 29/530,241, of Andersen, R., et al., filed Jun. 15, 2015.

Non-Final Office Action dated Mar. 1, 2017, for U.S. Appl. No. 14/220,064, of Maxwell, D.W., et al., filed Mar. 19, 2014.

Notice of Allowance dated Jun. 21, 2017, for U.S. Appl. No. 14/187,104, of Lee, R., filed Feb. 21, 2014.

Final Office Action dated Sep. 20, 2017, for U.S. Appl. No. 14/220,064, of Maxwell, D.W., et al., filed Mar. 19, 2014.

Notice of Allowance dated Mar. 15, 2018, for U.S. Appl. No. 14/730,860, of Sasmaz, Y., et al., filed Jun. 4, 2015.

Non-Final Office Action dated Apr. 5, 2018, for U.S. Appl. No. 14/088,113, of Maxwell, D.W., et al., filed Nov. 22, 2013.

Examination Report No. 2 for Australian Patent Application No. 2015264426, dated Jun. 20, 2018.

Non-Final Office Action dated Aug. 3, 2018, for U.S. Appl. No. 14/220,064, of Maxwell, D.W., et al., filed Mar. 19, 2014.

\* cited by examiner

| | | | |
|---|---|---|---|
| ☐ RECEIPTS DASHBOARD | | | |
| This Week 🔍 | | | |
| Date ⌄ | Merchant ⌄ | Items Purchased ⌄ | Amount ⌄ |
| Monday | Beanshop | Latte | $3.00 |
| Monday | Corner Cafe | Latte | $4.00 |
| Wednesday | Beanshop | Latte | $3.00 |
| Wednesday | Beanscenery | Latte | $2.50 |
| Thursday | Beanshop | Latte | $3.50 |
| Thursday | Corner Cafe | Latte | $5.00 |
| Friday | Beanshop | Latte | $2.00 |
| Saturday | Beanshop | Latte | $2.00 |

*FIG. 3*

INTERACTIVE DIGITAL PLATFORM

PRIORITY CLAIM

This application claims the benefit of U.S. Provisional Patent Application No. 61/901,986, entitled "INTERACTIVE DIGITAL RECEIPT", filed on Nov. 8, 2013, which is incorporated by reference herein in its entirety.

BACKGROUND

Due to the increasing popularity and acceptance of the computer and mobile devices, more and more financial transactions between merchants and customers are being conducted electronically. Many merchants have started to provide their customers with receipts electronically to maintain record of the financial transactions. For example, some merchants may provide a receipt through delivery of an electronic mail (i.e., e-mail). In another example, some merchants may make the receipt available through an online customer account on a merchant website. Various solutions are currently available to provide such receipt electronically, such as building an internal solution specific to a merchant's point of sale (POS) system or integrating with a third party solution into the merchant's POS.

The existing receipt solutions, however, are often limited in functionality and present many issues for both merchants and customers. For a customer, the receipts from the different merchants often get delivered in different ways (e.g., format, delivery method, etc.), and as such the customer is unable to manage the receipts digitally. For a merchant, a highly customized infrastructure change to existing POS system is needed in order to have a receipt solution that fits the merchant's needs; the merchant may not be ready to make such changes based on the business size, the cost, and/or the required technical knowledge. Further, the efforts required for such changes do not translate well in terms of a return on investment; the existing digital receipt solutions merely provide a record for the transactions, and nothing more.

Accordingly, a more robust, versatile system for providing a receipt electronically is needed.

BRIEF DESCRIPTION OF THE DRAWINGS

One or more embodiments of the present invention are illustrated by way of example and are not limited by the figures of the accompanying drawings, in which like references indicate similar elements.

FIG. 3 illustrate a screenshot of a receipts dashboard for managing interactive digital receipts implemented on a user device.

DETAILED DESCRIPTION

Figure 1A:
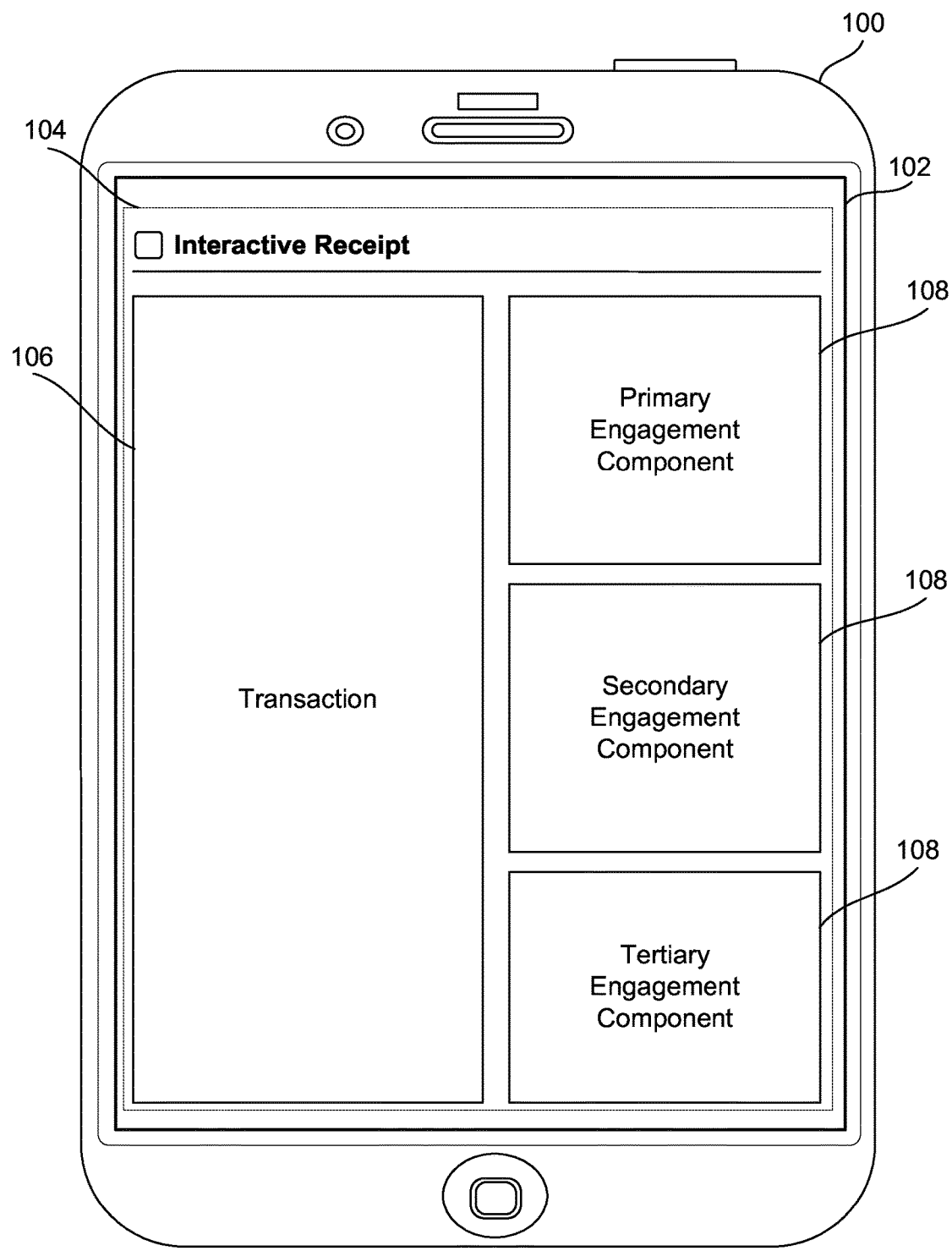
FIGS. 1A-1B illustrate a first embodiment of an interactive digital receipt technique implemented on a user device.

Introduced herein is a technique to provide an interactive digital receipt implemented on a user device, where the receipt offers an interactive platform for merchants and customers to interact on a continuous basis. The interactive digital receipt can be embodied in a text message, an electronic mail (e-mail), or a mobile software application. The interactive digital receipt is generated in response to an occurrence of a particular financial transaction between a merchant and a customer, such as a payment transaction conducted at a completion of service and/or goods provided by the merchant. The financial transaction may be an electronic transaction conducted over the Internet or a card present point-of-sale (POS) transaction where the customer/buyer/payer makes the purchase at a store front, other "brick-and-mortar" location, or simply in the presence of a merchant/payee.

Once the financial transaction takes place (i.e., the payer tenders payment to the payee), the interactive digital receipt is generated to provide the customer with an electronic record of the transaction. In addition to providing the transaction record, the interactive digital receipt provides one or more time-based engagements, or interactive components, to enable the merchant and the customer to engage, or interact, with one another. The time-based engagements include one or more features that are configured to be available (i.e., offered via the interactive receipt) to the user for a limited, predefined time period, allowing the engagements, or the interactions, to take place only until the expiration of the time period.

In some instances, the disclosed technique provides a time-based engagement that includes a gratuity payment feature to allow the customer to add a gratuity amount (i.e., "tip") on top of a payment amount for a purchase from a particular merchant. The gratuity payment feature allows the customer to tip the merchant after the time of the actual transaction, or purchase. The merchant may set the time limit at which the interactive receipt (for the purchase) is open for receiving the gratuity amount from the customer. The customer may set a nominal gratuity amount to operate as a default amount to be paid to the merchant if no gratuity is added after a predefined time limit. For example, such nominal gratuity amount may be set for a particular favorite merchant of the customer; that is, the customer desires to always tip a nominal amount even he/she forgets to add such amount after a transaction. The time-based gratuity payment feature is beneficial, for example, when the customer has forgotten to tip and desires to tip after he/she has already made the payment and left the merchant's store. The nominal gratuity amount may also be set by the merchant. This is beneficial in scenarios involving special services and/or goods. For example, a restaurant merchant sets a default 25% tip for any transaction involving 10 or more parties dining at the restaurant.

In some instances, the disclosed technique provides a time-based engagement that includes a feedback feature to allow the customer to leave a review (e.g., a write-up, a rating, etc.) for a particular merchant after a transaction is completed. The feedback feature is offered to the customer only within a predefined time period. The merchant may configure the predefined time period. For example, the time period can be an hour, a day, or a week after a payment transaction (e.g., a restaurant visit) has completed. The merchant may configure the predefined time period to be tied to an incentive. For example, the customer is rewarded a 20% Off Coupon via the interactive receipt for submitting a review within an hour of the transaction completion time. Such time-based feedback feature is beneficial, for example, when the merchant wants to increase visibility of the merchant venue (i.e., through reviews), to incentivize the customer to act more quickly in submitting the feedback, and/or to manage the collection of feedback more effectively and in a timely manner (e.g., allowing a review six days after the service is likely ineffective).

In some instances, the disclosed technique provides a time-based engagement that includes a time-based promotion feature to incentivize the customer to interact with a particular merchant within a predefined time period. The time-based promotion feature offers the customer a particular promotional reward associated with the merchant and/or the purchase, where the promotional reward reduces, or decreases in value, corresponding to a decrease in a passage of time. For example, a promotional $10 coupon is generated via the interactive receipt the moment a particular payment transaction has occurred between Store A and Customer X, where the coupon is redeemable at Store B, which is affiliated with Store A, if the coupon is redeemed at Store B within 24 hours. In such example, the $10 value of the promotional coupon decreases based on how long it has been since the transaction at Store A has completed; the value ultimately decreases to $0 in accordance with the passage of time. In this example, the sooner the customer redeems the $10 coupon, the higher the value he/she gets to redeem.

The customer may redeem the time-based promotional reward by completing various redemption (or "promotional") activities. Some promotional activities include simply revisiting the merchant to make another purchase for goods and/or services. Some promotional activities include participating in a game via the user device. Some promotional activities include visiting another affiliated merchant (e.g., affiliated store, affiliated website, etc.). The promotional activity and the decreasing rate of the promotional reward may be configured by the merchant offering the reward. Such time-based promotional reward feature is beneficial, for example, when the merchant wants to promote certain products or services and/or to engage the customers by offering certain incentives to act more quickly. The customer, on the other hand, benefits, for example, by getting more relevant merchant rewards (e.g., discounts at the merchant's store or affiliated stores).

In some instances, the disclosed technique provides a time-based engagement that includes a loyalty rewards record for the customer, where the loyalty rewards record is associated with every transaction conducted over time between the customer and a particular merchant. The loyalty rewards record (or "rewards record") tracks the purchases and/or services made by the customer from the particular merchant, and uses the tracking to log reward points for the customer being a "loyal customer." The rewards record enables the merchant, for example, to reward the customer for purchases (e.g., a free beverage for every 10 beverages bought) and enables the customer, for example, to receive an elite membership status for purchases made within a predefined time period (e.g., 10 beverages bought within a week).

In some instances, the disclosed technique provides a particular customer an interactive transaction record containing all interactive digital receipts of transactions between the particular customer and one or more merchants. The interactive transaction record organizes the interactive digital receipts based on time, location, and merchant. The interactive transaction record is updated along with each new interactive digital receipt that gets generated and or updated. Further, the interactive transaction record allows the customer to access each interactive digital receipt. This can be beneficial when the customer wants to revisit a record for a particular transaction. For example, if a customer wants to review and add a gratuity amount to a payment transaction completed recently, he can access the interactive transaction record to search for the particular transaction and add on a tip to the payment authorization for that transaction.

In some instances, the disclosed technique provides a user interface for a particular merchant to configure various time-based engagements that may be offered via the interactive digital receipts on the user devices of one or more customers. In some instances, the interface allows the merchant to create one or more customized templates for the interactive digital receipts of particular customers. As such, the disclosed technique allows the merchant to dynamically change what is being offered, or displayed, on the user device of the frequent customer.

Other aspects and advantages of the disclosed technique will become apparent from the following description in combination with the accompanying drawings, illustrating, by way of example, the principles of the claimed technique.

Figure 1B:
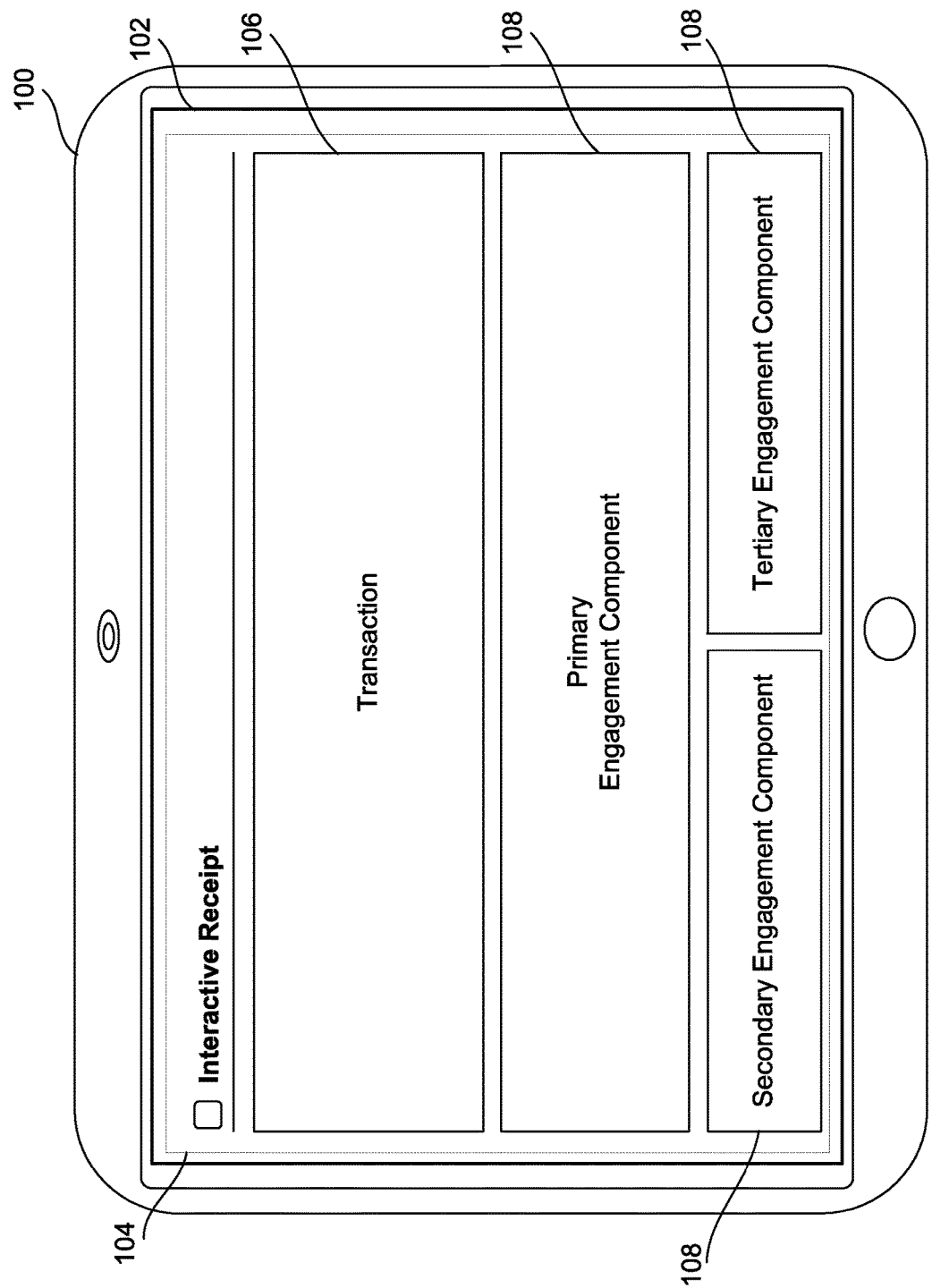

FIGS. 1A-1B illustrate a first embodiment of an interactive digital receipt technique implemented on a user device 100. As used herein, the term "user device" refers to any general-purpose computing device capable of data processing. In one example, the user device can be a mobile device, such as a smartphone (e.g., iPhone®, Android®-enabled phone, etc.), a personal digital assistant (PDA), a tablet, an e-reader, or other mobile or portable computing devices. In another example, the user device can be a personal computing device, such as a desktop, a laptop, or other wired and wireless personal computers. The user device 100 is equipped with a display screen 102 for displaying various user interfaces to enable a user to interact with content generated by the user device 100.

The user device 100 can implement an application, such as an interactive receipt mobile application for use by a mobile user, where the interactive receipt mobile application includes one or more customer interface components. As used herein, a "customer interface component" is a component of a user interface intended for a customer to view and interact with an interactive digital receipt 104. The interactive digital receipt 104 is generated for the customer after an occurrence of a financial transaction between the customer and a merchant (e.g., payment that occurs at the completion of a service and/or tendering of goods), where the interactive digital receipt 104 is displayed on the display screen 102 of the user device 100. It is noted that the interactive digital receipt 104 may take up an entirety or any portion of the display screen 102.

Referring to FIGS. 1A and 1B, the interactive digital receipt 104 includes various interactive components, such as a customer transaction interface component 106 ("transaction component") and one or more customer engagement interface components 108 ("engagement component"). The transaction component 106 displays details associated with a particular transaction between the customer and the merchant, where the transaction details are displayed in real time in response to an occurrence of the particular transaction (e.g., payment transaction at the completion of a service).

For example, when the customer has made a payment to the merchant, the interactive digital receipt is automatically generated on the user device 100, and included on the receipt are details of the purchased items and prices generated by the transaction component 106.

The one or more engagement components 108 displays in real time one or more features for the merchant and the customer to interact or engage with one another. The features generated are configured to be available via the interactive digital receipt only within a predefined time period. The predefined time period is configurable by the merchant and allows the merchant to provide time-based incentives to engage the customer to interact with the merchant. Further details regarding the engagement components and the transaction component will be discussed in FIGS. 1C-1H.

Figure 1C:
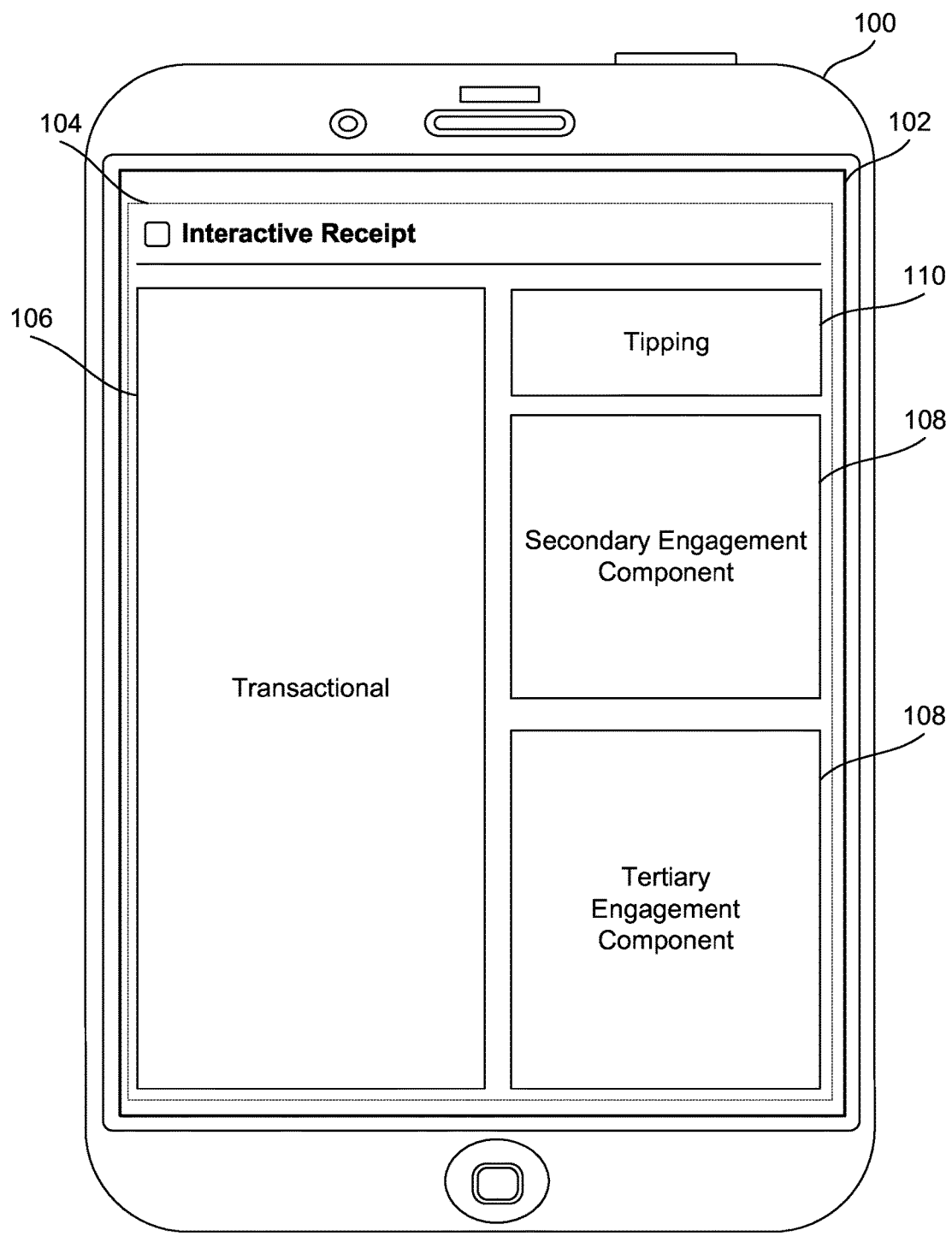
FIGS. 1C-1E illustrate a second embodiment of an interactive digital receipt technique implemented on a user device.
Figure 1D:
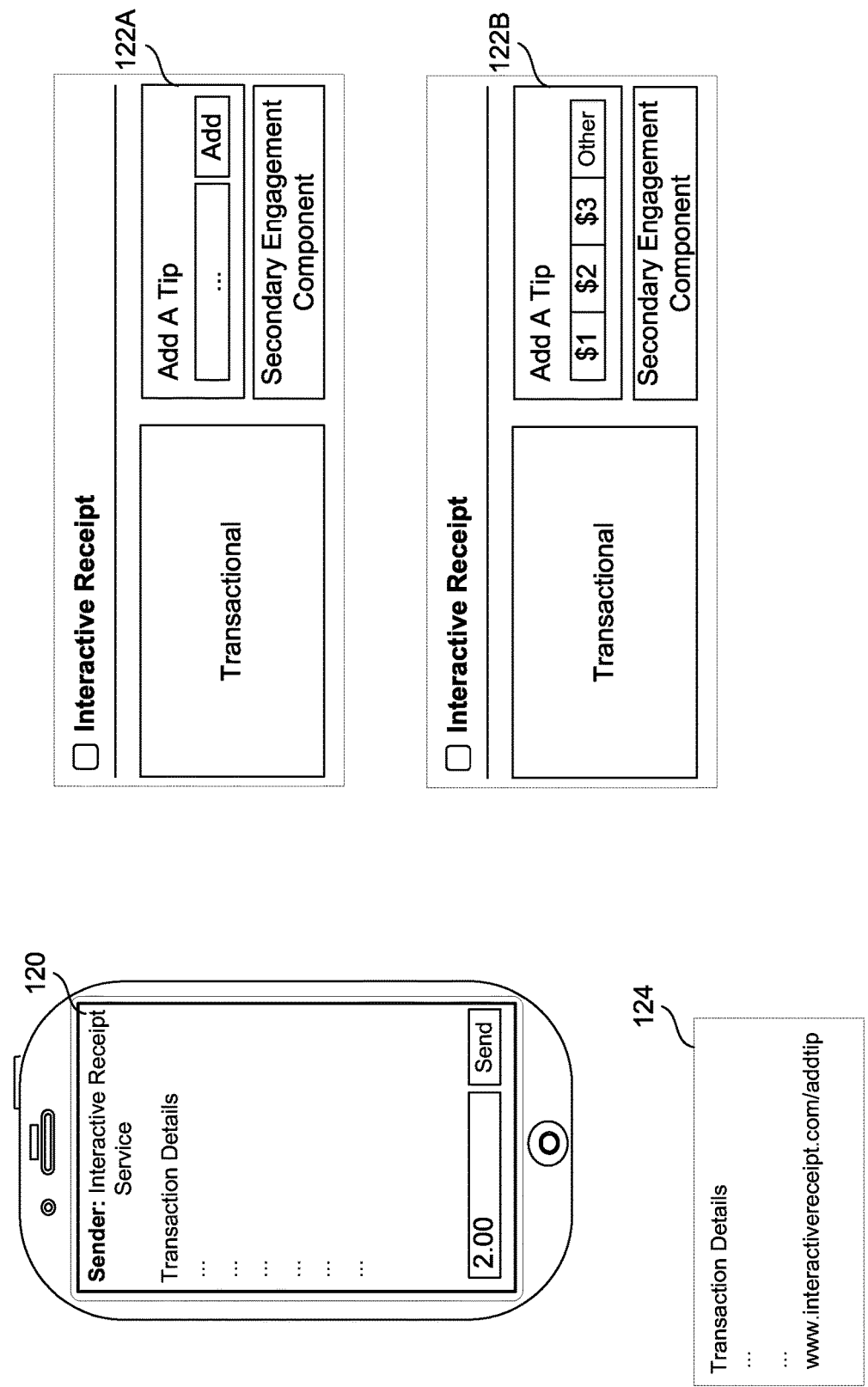
Figure 1E:
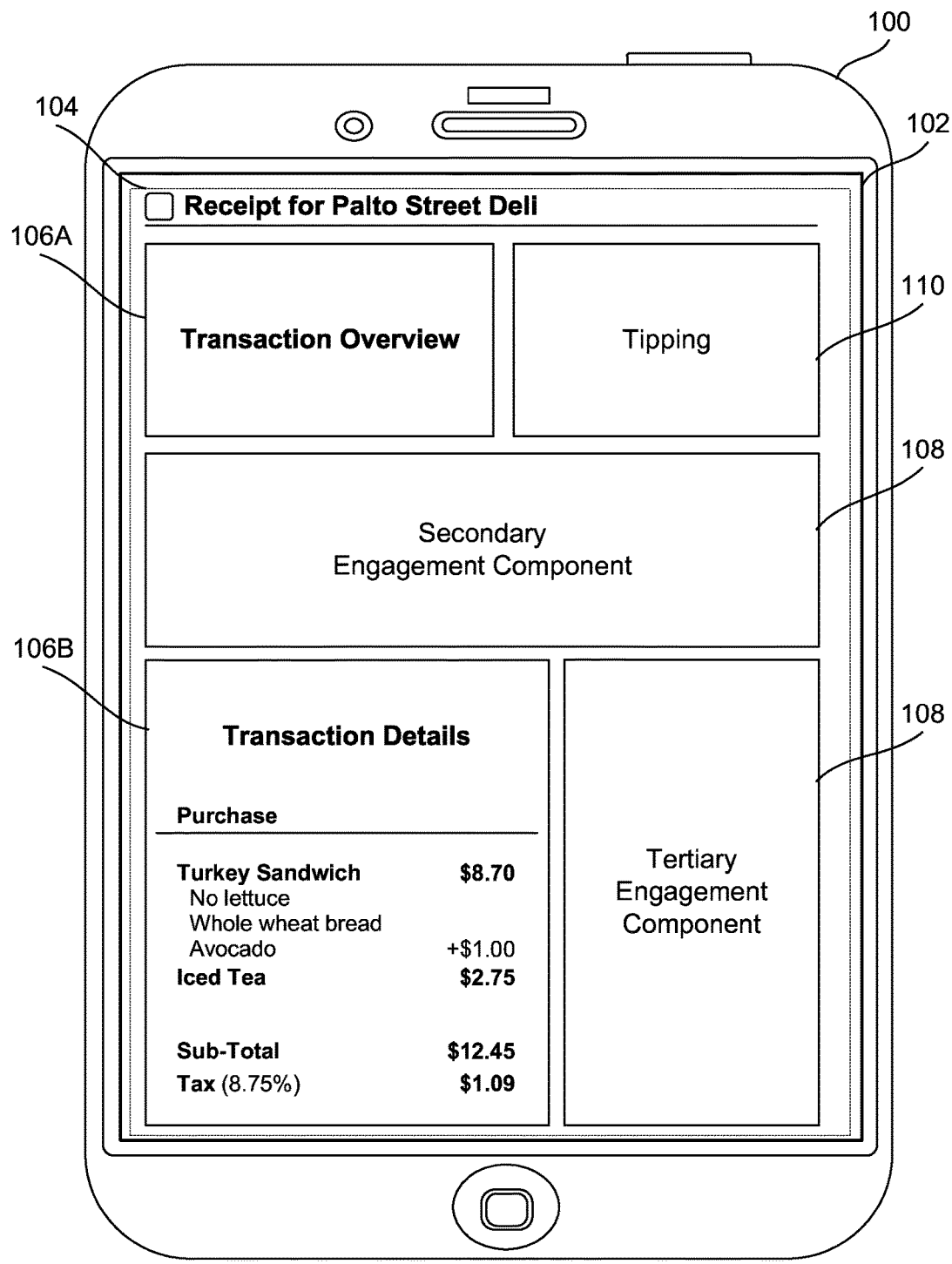

FIGS. 1C-1E illustrate a second embodiment of an interactive digital receipt technique implemented on a user device 100. As illustrated in FIG. 1C, the interactive digital receipt 104 includes an engagement, or interactive, component for generating a tipping feature 110. The tipping feature 110 allows the customer the option to add a gratuity amount (i.e., "tip") after the occurrence of a particular transaction with a merchant (e.g., tendering or completion of a payment for goods and/or service); such a transaction may be, for example, payment for a meal at a restaurant visit, where the customer is able to leave a tip after he/she has left the restaurant. The tipping feature enables any tip added by the customer to be directly transmitted to the payment system, without any human interference. For example, after the customer has tendered his credit card to the merchant to pay for a meal, the interactive digital receipt is generated on the customer's mobile device. Using the mobile device, the customer can then proceed to add a tip, and such tip (e.g., credit card authorization of the tip) is directly sent to the payment system to be added together with the already authorized payment amount, without the merchant having to physically enter and submit the tip authorization to the payment system.

The tipping feature 110 may be embodied in the interactive digital receipt in a variety of ways, as illustrated in FIG. 1D. In one example, the interactive digital receipt is a text message 120. In such example, upon receiving the receipt via text, a user can add on a tipping amount to the transaction by replying to the text message 120 and entering a number (e.g., "2.00" for a $2.00 tip). In another example, the interactive digital receipt is displayed as part of a user interface associated with a mobile application ("App"). In such example, the tipping feature 110 is a text box 122A within the interactive receipt (e.g., interactive receipt 104), and the user can add on a tipping amount by entering a number directly in the text box. The tipping feature 110 embodied within the App may also be a user interface component 122B with default tip amounts displayed to the user. The default amounts can be configured to change based on the payment amount associated with the transaction (e.g., an amount equivalent to 15%, 20%, etc.). The user can quickly add the tipping amount by clicking on any of the default amounts displayed. In yet another example, the interactive digital receipt is a Uniform Resource Locator (URL) link 124 which takes the user to a web page to allow adding of the tipping amount. The link 124 can be a part of the text message 120, a part of the text box 122A, the component 122B, or an electronic mail (e-mail).

The tipping feature 110 is configurable in various ways to implement various functionalities. In one embodiment, the tipping feature is configured to be available at any time, and for an unlimited time period, starting after a time instance when payment has been authorized (e.g., after the customer has authorized the payment amount using his/her credit card to pay the merchant). In one embodiment, the tipping feature 110 is configured to be available only for a limited, predefined time period, or timeframe, after the authorization for the payment amount has been granted by the customer. As used herein, the term "timeframe" refers to a time limit during which the tipping feature remains available for receiving a gratuity amount authorization from the customer. The timeframe may be, for example, an hour, a day, a week, or any other desired time period (e.g., unlimited). In some embodiments, the timeframe is configured by the merchant. In other embodiments, the timeframe is configured by an operator of the interactive digital receipt system.

The timeframe of the tipping feature 110 is initialized, or started, at a time instance at which the transaction between the customer and merchant has occurred (i.e., a tender of payment has been completed). The timeframe decreases incrementally, from this time instance, at a rate that corresponds to an ordinary passage of time. For example, once a customer submits a payment (e.g., authorizes payment amount via a debit card), an interactive digital receipt is generated for the customer and the timeframe for tipping associated with that receipt is initialized (i.e., the countdown starts) at the moment the receipt is generated. At the expiration of the timeframe (i.e., the countdown reaches 0), the tipping feature becomes unavailable to the customer (e.g., the feature becomes an invalidated feature). In a real-world setting, such time limitation helps the merchant manage its financial transactions more efficiently. For example, a merchant often processes its financial transactions in batches and would not want to keep any particular transaction open indefinitely.

In one embodiment, the timeframe of the tipping feature 110 may be configured to incorporate a user definition of a default gratuity amount. In particular, a user of the user device 100, such as a customer, may define a nominal gratuity amount to be automatically paid to certain merchants if no gratuity amount is submitted at the expiration of the timeframe. For example, a customer defines the gratuity amount to be $10 for the customer's favorite restaurant. In such example, the $10 tip is automatically authorized for any transaction with that restaurant whenever no gratuity amount is added at the timeframe expiration. The customer can also define the nominal gratuity amount to be zero. In some embodiments, the default gratuity amount may be defined by the merchant. For example, a restaurant merchant may want to configure a nominal gratuity amount to be defined for restaurant services to groups of six parties or more. In such example, when no tip is added to the payment amount at the end of a timeframe (e.g., 2 hours), an automatic 20% of the payment amount is authorized on the customer's payment card as the tip amount, and the 20% tip amount gets added in the final transaction payment.

Referring to FIG. 1E, the interactive digital receipt 104 can include two transaction components 106A, 106B, in addition to the tipping feature 110. The transaction component 106A includes an overview of the transaction completed between the customer and the merchant, such as the total amount of the transaction, the payment card used for the transaction (e.g., last four digits of a credit card), the date, or the like. The transaction component 106B includes the details of the transaction, such as the name of the items purchased, the quantity, the price, or the like.

Figure 1F:
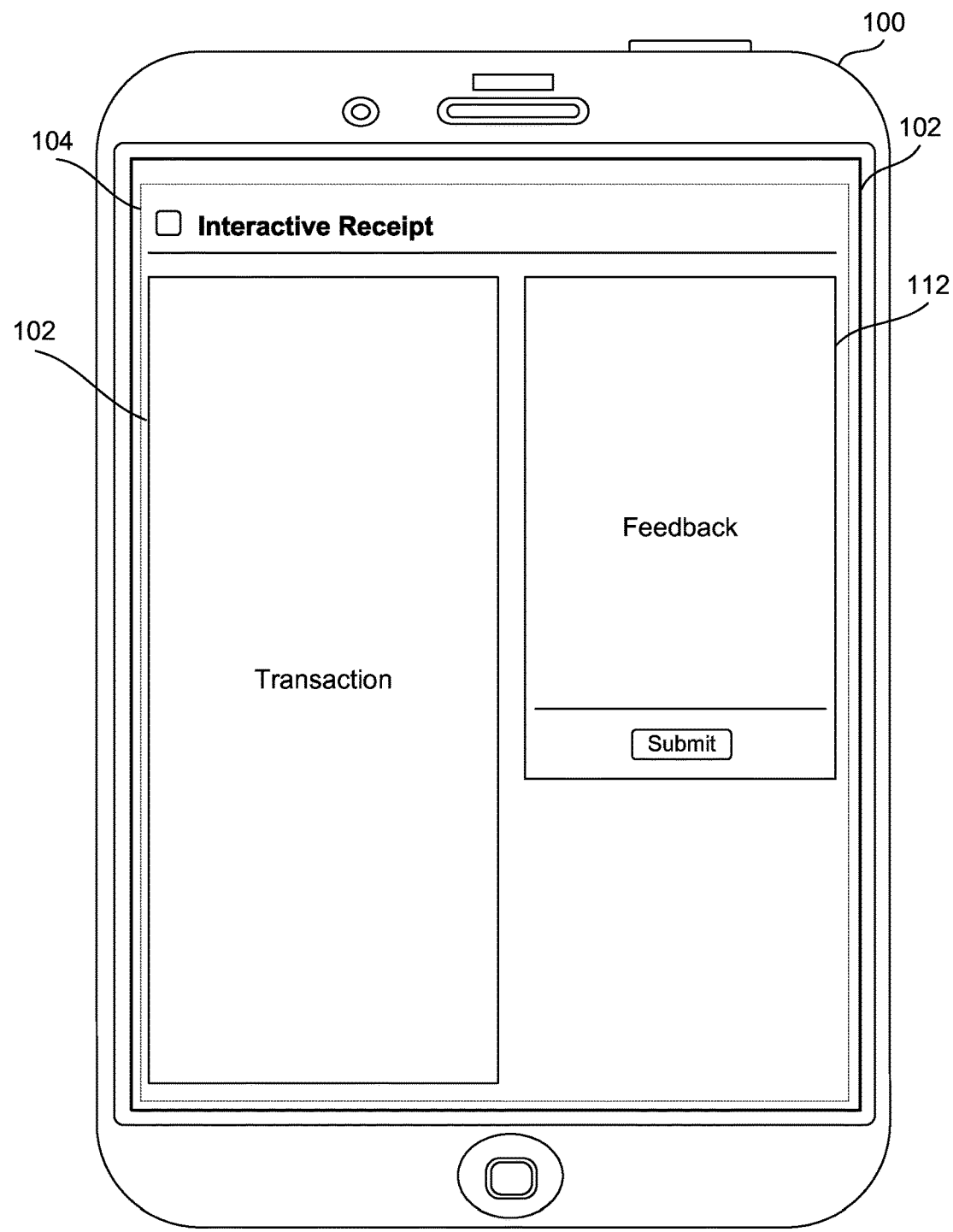
FIGS. 1F-1H illustrate a third embodiment of an interactive digital receipt technique implemented on a user device.
Figure 1G:
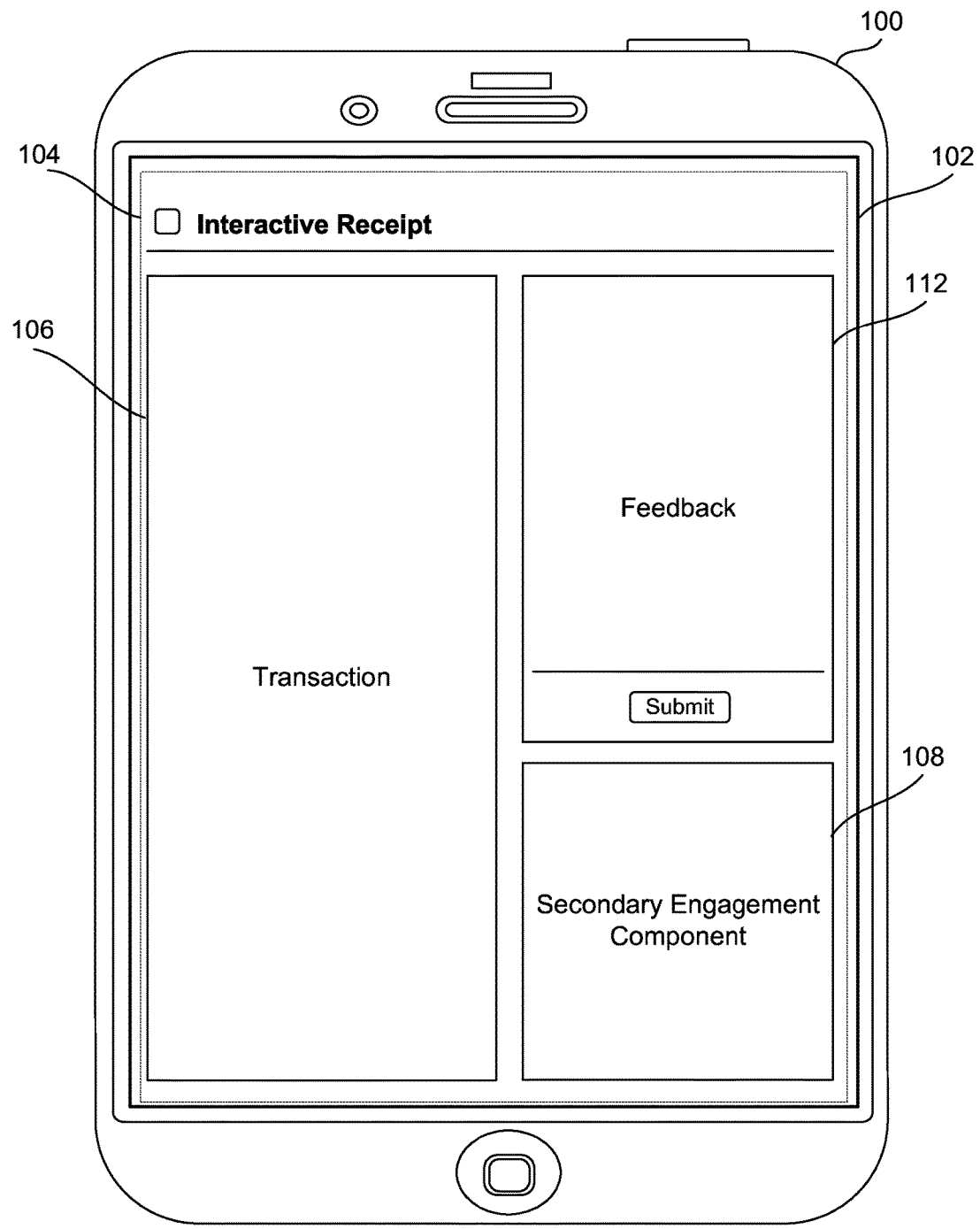
Figure 1H:
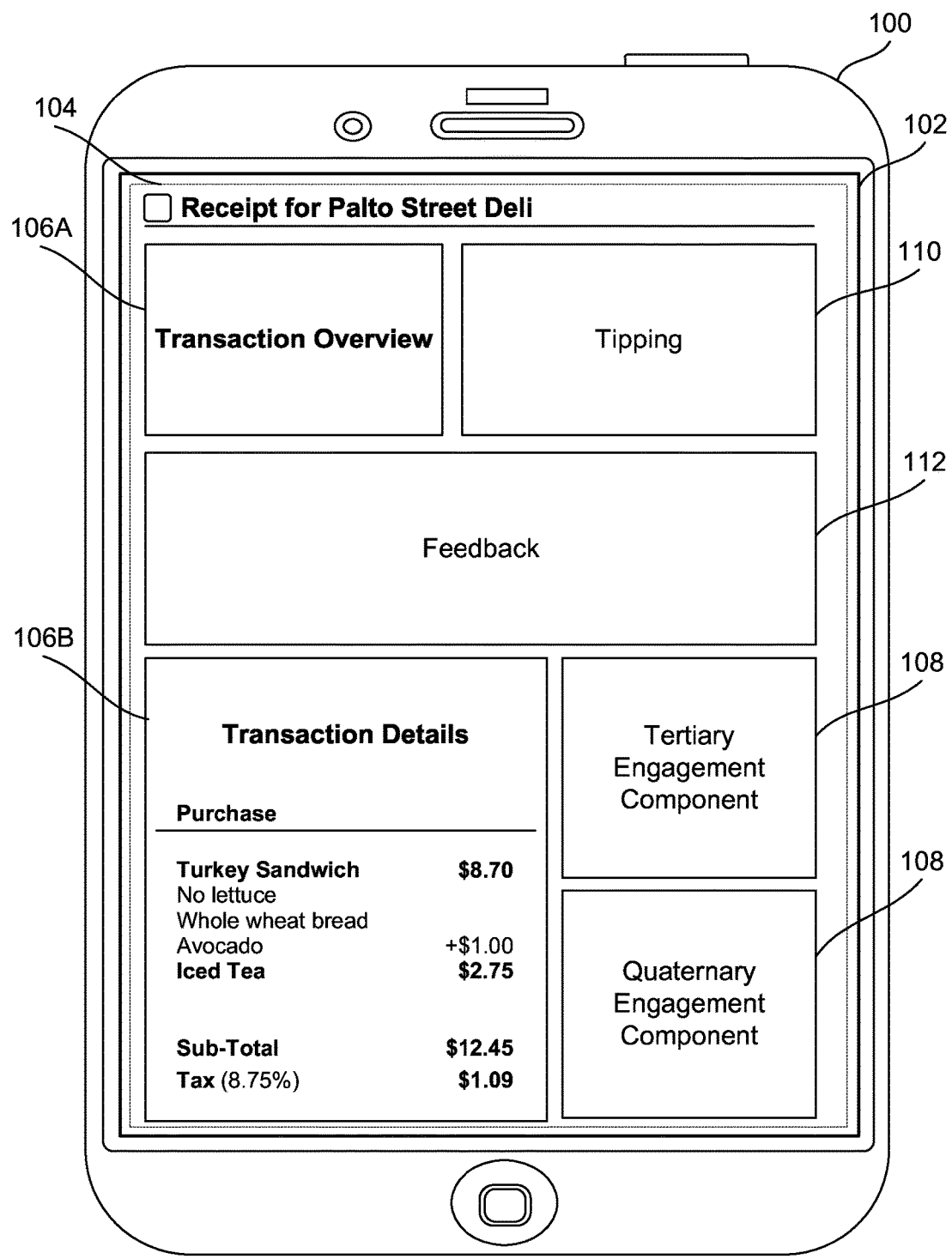

FIGS. 1F-1H illustrate a third embodiment of an interactive digital receipt technique implemented on a user device 100. As illustrated in FIG. 1F, the interactive digital receipt 104 can include an engagement, or interactive, component that contains a feedback feature 112. The feedback feature 112 allows the customer (i.e., payer, consumer, or the like) to submit feedback after the completion of a particular transaction with a merchant (i.e., payee). The feedback may include submitting, for example, a rating (e.g., 5 stars), a review, a suggestion, or the like, on various aspects of the transaction (e.g., store cleanliness, service, products, overall visit satisfaction, etc.). In some embodiments, the feedback is submitted directly to the merchant. In some embodiments, the interactive digital receipt system coordinates, communicates, and links with third party services associated with the merchant in implementing the feedback feature 112. In such embodiments, the feedback is transmitted to the third party services upon submission via the interactive digital receipt. The third party services aggregate the feedback in association with other feedback provided by the merchant. Such third party services may include, for example, Yelp.com, Urban Spoon, YP.com, and the like. In an illustrative example, the feedback feature 112 provides an option for the customer to submit indirectly a write-up review to Yelp.com by using the feedback feature 112. In such example, the customer can write the review in a text box within the interactive receipt and the review is transmitted to Yelp® when the customer clicks Submit.

In one embodiment, the feedback feature 112 is configurable to be available only for a predefined time period, or timeframe. In some embodiments, the timeframe associated with the feedback feature 112 ("feedback timeframe") is configured to be the same as the timeframe associated with tipping feature 110 ("tipping timeframe"). For example, the timeframe may be set at one hour and at the expiration of the hour, both the tipping feature and the feedback feature are made unavailable to the customer. In some embodiments, the feedback timeframe is configured to be different from the tipping timeframe. For example, the feedback timeframe may be set at one week while the tipping timeframe may be set at one hour. In such example, at the expiration of the tipping timeframe, a customer may still be able to submit feedback for the corresponding transaction.

In some embodiments, the feedback timeframe is configured by an operator of the interactive digital receipt system. For example, the feedback timeframe can be configured to be the same for all participating merchants of the interactive digital receipt system. In other embodiments, the feedback timeframe is configured by a particular merchant. For example, the merchant can configure the feedback timeframe to be one day, one week, or any desired amount.

In one embodiment, a particular merchant may configure the feedback timeframe to be tied to an incentive (i.e., "feedback reward") for encouraging submission of a feedback. The incentive may be based on a time of submission of the feedback. For example, the customer is rewarded a "20% Off Coupon" incentive, or feedback reward, if a written review is submitted before expiration of the feedback timeframe, e.g., within an hour after the time of completion of a transaction. In another example, if the feedback is submitted within 10 minutes after the completion of the payment transaction between the user and the remote user, the reward is a 20% Off coupon; on the other hand, if the feedback is submitted within 12 hours, but not exceeding the transaction timeframe allowed for the feedback (e.g., 24 hours), the reward is a 5% coupon.

The feedback feature 112 may be provided in the interactive digital receipt 104 in various configurations, as illustrated in FIGS. 1F-1G. Referring to FIG. 1G, the feedback feature 112 can be provided along with contents from the transaction component 106 and another engagement 108. Referring to FIG. 1H, the feedback feature 112 can be provided along with the tipping feature 110. The features 110, 112 may be configured according to a particular merchant's needs. For example, a merchant in the business of selling household supplies can configure the interactive digital receipt to generate the feedback feature 112 without generating the tipping feature 110. In another example, a merchant in the business of operating a restaurant can choose to have both the tipping feature 110 and the feedback feature 112 be generated in the interactive digital receipt 104. One of ordinary skill in the art will appreciate that other configurations are possible.

Figure 1I:
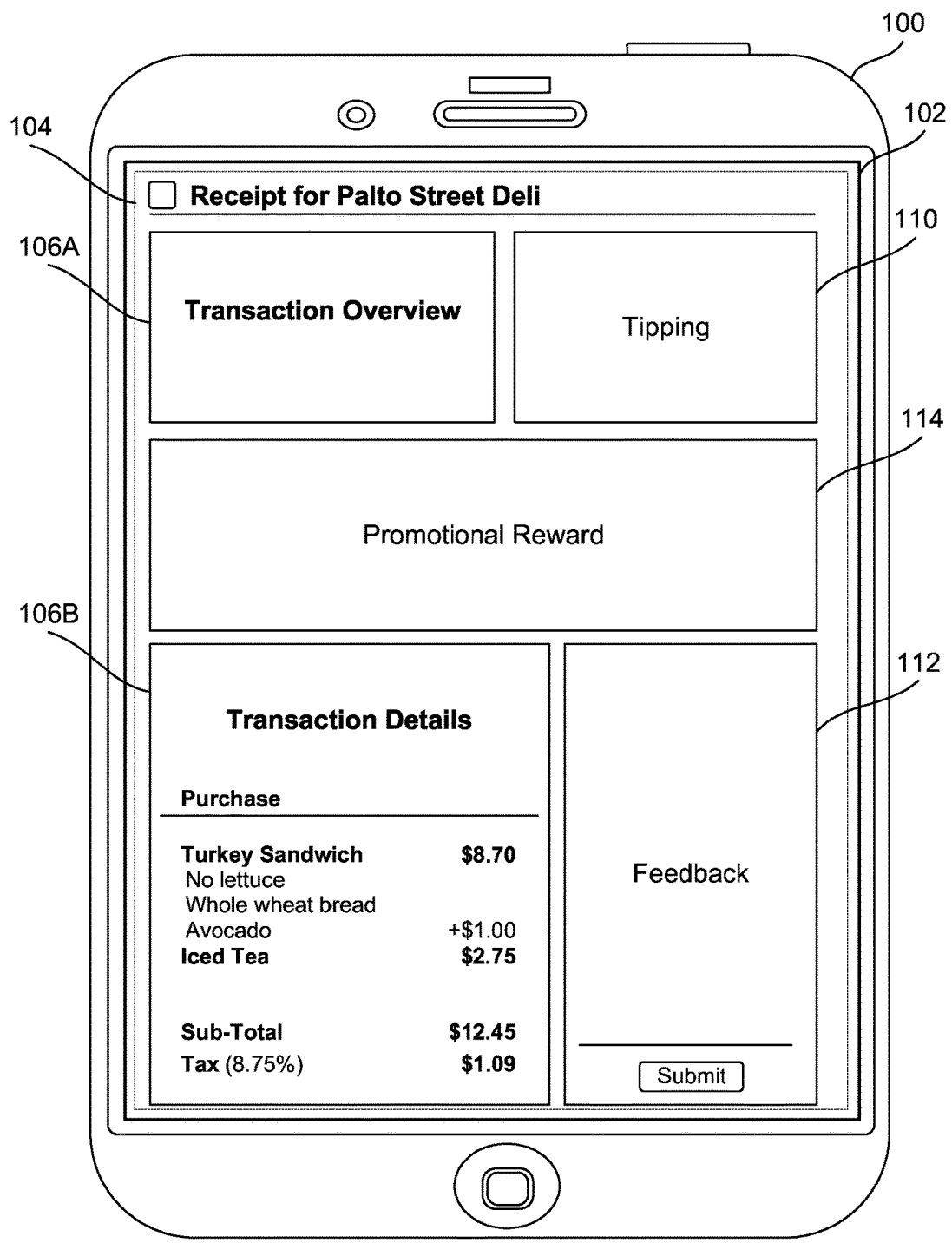
FIG. 1I illustrate a fourth embodiment of an interactive digital receipt technique implemented on a user device.

FIG. 1I illustrate a fourth embodiment of an interactive digital receipt technique implemented on a user device. As illustrated in FIG. 1I, the interactive digital receipt 104 includes an engagement, or interactive, component for generating a promotional reward feature 114. The promotional reward feature 114 allows a particular merchant to engage and incentivize a customer to interact with the merchant within a predefined time period, or timeframe. In some embodiments, the timeframe associated with the promotional reward feature 114 ("promotion timeframe") is configured to be the same as the timeframe associated with the feedback feature 112 ("feedback timeframe"), or the timeframe associated with the tipping feature 110 ("tipping timeframe"), or both. For example, the timeframe may be set at one hour, and at the expiration of the hour, the promotional reward feature, the feedback feature, and the tipping feature are all made unavailable to the customer. In some embodiments, the promotion timeframe is configured to be different from each of the feedback timeframe and the tipping timeframe.

The time-based promotional feature 114 offers the customer a particular promotional reward (or "promotion") associated with the merchant and/or the transaction completed, where the promotional reward reduces, or decreases in value, corresponding to a decrease in the passage of time associated with the timeframe. For example, a $10 coupon is generated via the interactive digital receipt the moment a restaurant payment transaction occurs (e.g., authorization of payment amount is completed). The coupon promotes the restaurant by offering the customer $10 off on a next meal at the restaurant. Such $10 coupon decreases in value from the moment the coupon is generated; ultimately, the coupon decreases to a $0 value unless the customer redeems the coupon (e.g., by buying another meal at the restaurant). As such, the sooner the customer redeems the time-based coupon, the higher the value he/she gets to redeem.

The merchant may configure the rate of the reduction in value and/or the timeframe associated with the promotional reward. In one example, the restaurant sets the $10 coupon to expire after a week, with no reduction in value at all as long as the coupon is redeemed at the end of the week. In another example, the restaurant sets the $10 coupon to expire after 3 days, where the value reduces each day until the value reaches $0 at the end of the third day. The value may reduce in accordance with the passage of time or it may reduce according to a rate set by the merchant. For example, the value decreases at an exponential rate.

In some embodiments, the customer may redeem the time-based promotional reward by completing various redemption, or promotional, activities. Some redemption activities include simply revisiting the merchant to make another purchase for goods and/or services, as discussed in the example above. Other redemption activities include participating in a game via the user device. Some redemption activities include participating in activities with other merchants affiliated with the merchant that offers the promotional reward. For example, the original merchant may offer a 15% Off Coupon, yet that coupon is redeemable only at the original merchant's affiliated store. The redemption activity and the decreasing rate of the time-based reward may be configured by the merchant offering the reward. Such configurations are beneficial as they allow the merchant to customize the promotions according to the merchant's business, such as tailoring to an advertising campaign or a targeted customer demographic.

The promotional feature 114 may be provided in the interactive digital receipt 104 in various configurations. As illustrated in FIG. 1I, the promotional feature may be combined with the tipping feature 110 and the feedback feature 112. One of ordinary skill in the art will appreciate that other configurations are possible.

Other engagements, or interactive components, not shown in FIGS. 1-1I may also be implemented via the interactive digital receipt displayed on the user device. In one embodiment, the engagement includes an interactive transaction record. The interactive transaction record includes one or more interactive digital receipts that has resulted from one or more financial transactions belonging to the customer. A particular interactive record may be configured to include only interactive digital receipts associated with a particular merchant. A particular interactive record may be configured to include all interactive digital receipts associated with the customer, including receipts associated with different merchants with whom the customer has transacted. The interactive transaction record allows the customer to organize his/her interactive digital receipts and provides a comprehensive view of all payment transactions.

In one embodiment, the engagement includes an interactive advertisement component (e.g., promotion for product and/or service) to catch the user's attention using advertisement with various content. Such advertisement may include, for example, the promotional reward feature 114 to entice the user to "click-on" or select a particular offering being displayed on the display screen. In yet another example, the advertisement may be a plain display with no interaction required from the customer, where the interaction comes from the advertisement content changing to attract the customer's attention. The advertisement content may be related to the completed transaction for which the receipt 104 is generated. For example, for a coffee purchase transaction, the advertisement includes information about a sustainable coffee alliance organization. The advertisement can also include information about nearby merchants associated with the venue where the completed transaction has taken place. In some embodiments, the interactive advertisement component is coupled to the interactive transaction record, where advertisement content is changed based on details extracted from the interactive transaction record.

The engagement, in another example, can include a loyalty rewards record associated with the customer and a particular merchant. The loyalty rewards record (or "rewards record") tracks and updates purchases and/or services completed with the merchant over time and maintains a membership status of the customer in relation to the merchant. Reward points are stored and updated in the rewards record for purchases and/or services transacted with the merchant within a predefined time period. For example, the rewards record tracks the number of baked goods bought from a bakery and updates the customer to an "elite status" in relation to that bakery for buying 10 items within 5 days. The customer, with the elite status evident on his/her rewards record, can redeem for a reward with the bakery. Other customer engagements (or interactive components) not discussed above, but consistent with the techniques discussed throughout, may also be envisioned by one of ordinary skill in the art.

Figure 2:
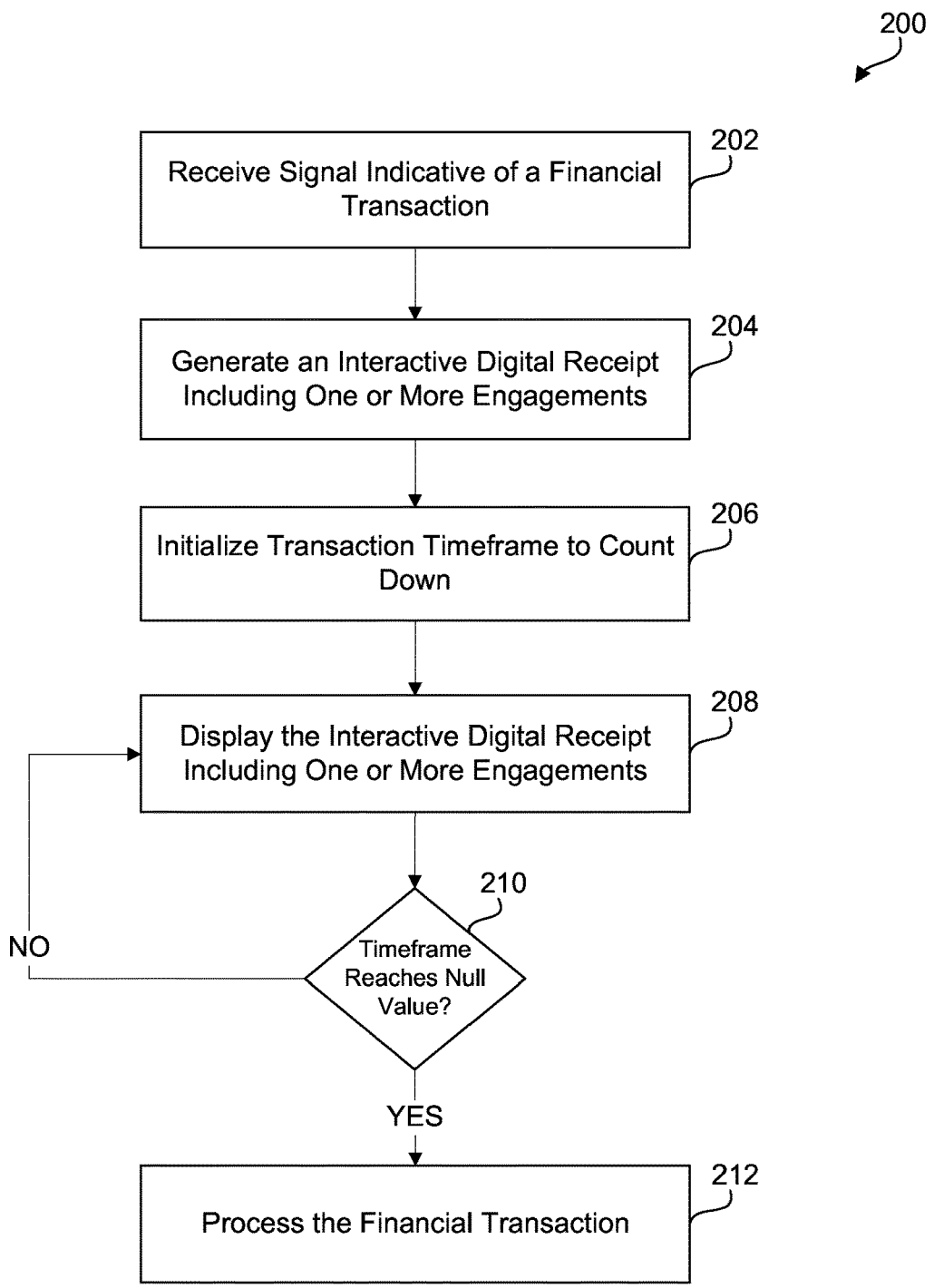
FIG. 2 illustrates a flow diagram of a process for implementing an interactive digital receipt technique on a user device.

FIG. 2 illustrates a flow diagram of a process 200 for implementing an interactive digital receipt technique on a user device. The user device may be the user device 100 of FIGS. 1A-1I. In some embodiments, the process 200 is implemented by the user device. In some embodiments, the process 200 is implemented by an interactive digital receipt system, such as the system 602 of FIG. 6. The interactive digital receipt system may be implemented as a mobile application on the user device, such as a smartphone.

At step 202, the user device receives a signal indicating that a financial transaction, such as a payment transaction, between a user of the user device (e.g., a customer, a payer, a buyer, etc.) and a remote user (e.g., a merchant, a seller, etc.). The signal may be communicated, or transmitted, from the remote user's POS system to indicate that the user has made a payment to the remote user (i.e., to indicate that the transaction has been completed). At step 204, the user device generates an interactive digital receipt to provide an electronic record of the transaction that has been completed between the user and the remote user. The interactive digital receipt may be the receipt 104 of FIGS. 1A-1I. The interactive digital receipt is configured to be a "living" digital receipt that continues to be maintained and updated on the user device. The receipt allows the user to engage in one or more engagements, or interactions, associated with the transaction, even after the transaction has been completed (i.e., payment has been tendered). The one or more engagements provided on the receipt are time-based and may be configured by the remote user, the user, or a combination thereof, as discussed above in the descriptions of FIGS. 1A-1I.

At step 206, the user device initializes a transaction timeframe to count down in response to the interactive digital receipt being generated; that is, the transaction timeframe starts decreasing incrementally until it reaches a null value once the receipt is generated. At step 208, the user device displays the interactive digital receipt on a display screen of the user device. The interactive digital receipt includes one or more engagements being displayed to the user on the display screen.

In one embodiment, the engagements includes a gratuity option that allows the user the capability to authorize a gratuity amount (or "tip") after the payment amount has been tendered, such as a credit card authorization of the payment amount (i.e., at step 202). The gratuity option allows any tip added by the user to be directly transmitted to the payment system. For example, once a restaurant patron has given the waiter her credit card to pay for the meal, the patron can add the tip amount by herself without needing the waiter to physically enter the additional tip amount into the payment system. In such example, the patron can simply add the tip on top of the original meal amount via the interactive digital receipt, and the additional credit card authorization is directly sent to the payment system; with the gratuity option available, the patron may choose to add the tip while she is still present at the restaurant or after she has left the restaurant.

As discussed above, in one embodiment, the gratuity option is available to the user for an indefinite time. In another embodiment, the gratuity option is limited by the transaction timeframe. In such embodiment, the user must utilize the gratuity option within the transaction timeframe, i.e., before the timeframe reaches the null value. When the timeframe reaches the null value, the gratuity option is disabled and the user is no longer able to authorize an additional transaction amount for gratuity. The timeframe may be configured to be an unlimited time period (i.e., no expiration).

As discussed above in FIGS. 1A-1I, the gratuity option may be provided, or displayed, via the interactive receipt along with other engagements, or interactive components, such as a time-based feedback option, a time-based promotional reward, and/or a rewards record. Accordingly, as discussed above, the transaction timeframe associated with the engagement(s) provided via the receipt may include one or more different timeframes for each type of engagement being displayed on the interactive digital receipt (e.g., tipping timeframe, promotion timeframe, feedback timeframe, etc.).

At step 210, the user device determines whether the transaction timeframe has reached a null value, i.e., "0" time left. If time still remains, then the device continues to display the engagements to engage the user, as indicated in step 208. If no time remains, the user device processes the transaction, as indicated in step 212. Processing the transaction may include updating the interactive digital receipt based on the user's interactions with the one or more engagements displayed on the display screen.

In one embodiment, processing the transaction at step 212 may include transmitting to the remote system (e.g., payment system) an additional payment authorization for a gratuity amount (or "tip") submitted by the user. In one example, the user may have chosen to interact with the gratuity option displayed at step 208 to add the gratuity amount to the transaction. In another example, the user may have predefined a nominal gratuity amount to be automatically authorized when no gratuity amount is added for a transaction with the remote user. However, if the user does not choose to interact with the gratuity option and/or to define a nominal gratuity amount, no additional payment authorization step is carried out in step 212.

In one embodiment, processing the transaction at step 212 may include updating the remote user's database with feedback completed by the user via the interactive digital receipt. The processing may also include transmitting to the user an incentive reward for completing (i.e., submitting) the feedback. As discussed above, the incentive reward may be based on a time of submission of the feedback.

In one embodiment, processing the transaction at step 212 may include processing for the user (e.g., customer) a time-based reward for completing a redemption activity associated with the remote user (e.g., merchant). The time-based reward may be maintained and accessed via the interactive digital receipt, where the user may choose to use the reward at any time after the redemption activity has been completed.

In one embodiment, processing the transaction at step 212 may include updating one or more records associated with the user. Updating the records may include updating the user's loyalty rewards record and updating the user's interactive transaction record. The interactive transaction record includes one or more interactive digital receipts resulting from one or more financial transactions belonging to the user. A particular interactive record may be configured to include only interactive digital receipts associated with a particular merchant. A particular interactive record may be configured to include all interactive digital receipts associated with the user, including receipts associated with different merchants with whom the user has transacted.

Updating the user's loyalty rewards record may include analyzing details of the transaction between the user and the remote user (i.e., the completed transaction of step 202). Analysis of such details allows the user device to update the quantity of a particular item the user has transacted with the remote user (e.g., 3 purchased beverages) and update the user's membership status.

Updating the user's interactive transaction record may include adding the interactive digital receipt associated with the completed transaction to a list of existing interactive digital receipts. The interactive transaction record may be stored on the user device.

FIG. 3 illustrate a screenshot of a receipts dashboard 300 for managing interactive digital receipts. The receipts dashboard 300 may be embodied as the interactive transaction record discussed above. The receipts dashboard 300 may be implemented on a user interface of a user device (e.g. user device 100 of FIGS. 1A-1I) to allow a user (e.g., a customer, a payer, a buyer, etc.) to view a list of interactive digital receipts. The interactive digital receipts are associated with one or more completed financial transactions between the user and one or more merchants.

Referring to FIG. 3, the receipts dashboard 300 includes a search feature 302 and a selection feature 304. The interactive digital receipts may be viewed and/or organized by using the selection feature 302 to select an organization based on a time, a merchant, an item type, or a transaction amount. The user may search for a particular interactive digital receipt using the search feature 304.

Figure 4:
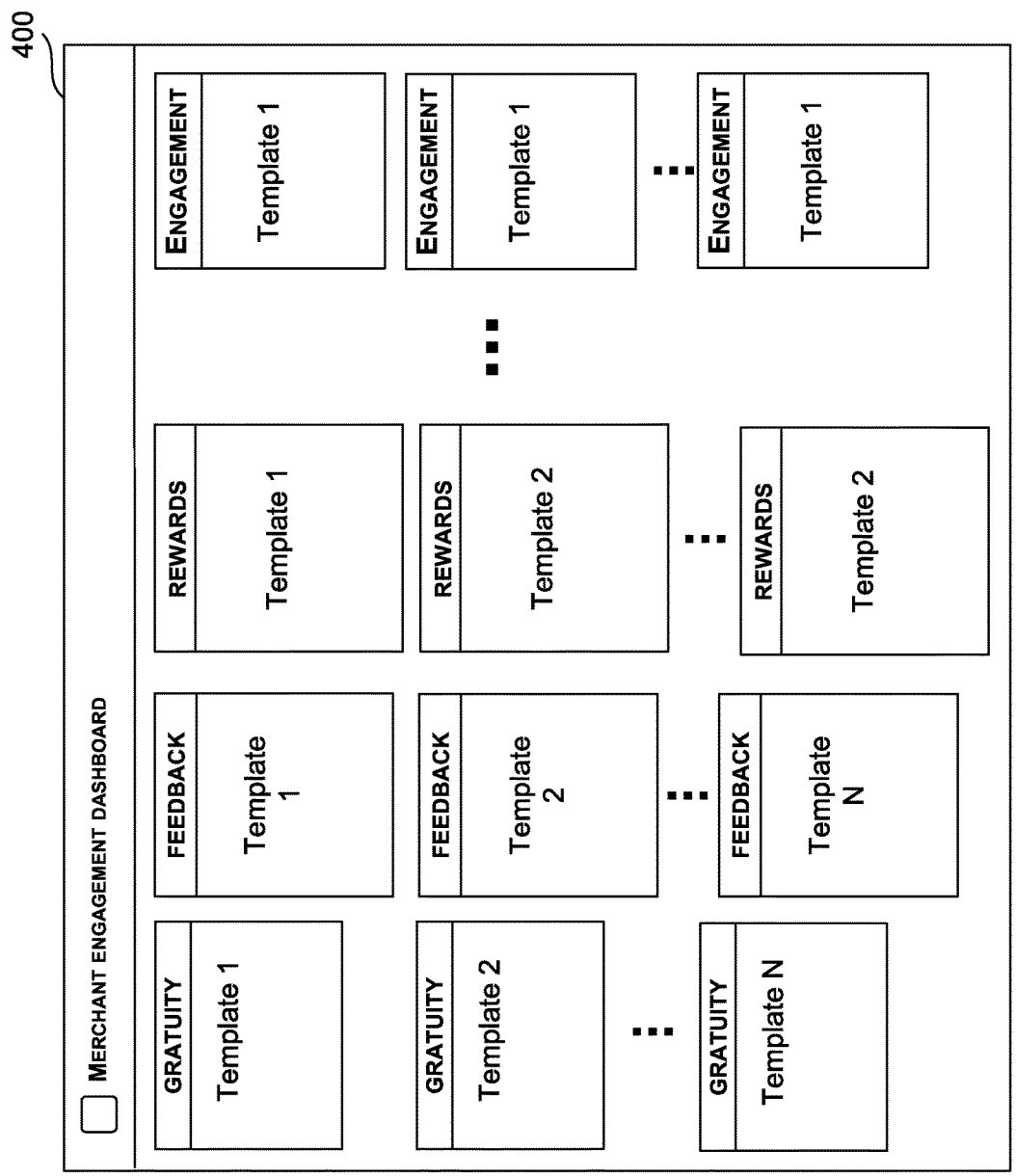
FIG. 4 illustrates a screenshot of an engagement dashboard for managing merchant engagements with customers.

FIG. 4 illustrates a screenshot of an engagement dashboard 400 for managing merchant engagements with customers. The engagement dashboard 400 may be part of a user interface implemented on a merchant computing system, such as the merchant transaction system 606 of FIG. 6. The engagement dashboard 400 is connected to an interactive digital receipt system (e.g., the system 602 of FIG. 6) that is configured to generate one or more interactive digital receipts on a user device of a customer.

The engagement dashboard 400 enables the merchant to customize various time-based engagements that may be offered via the interactive digital receipt to the customer. Using the engagement dashboard 400, the merchant may dynamically change the engagement type that is generated, or displayed, to a particular customer at the completion of every transaction. Further, the merchant may choose between different templates of a particular engagement type to be displayed. Such dynamic capability enables the merchant to utilize the interactive digital receipt according to the business needs of the merchant. For example, for a frequent customer, the merchant may choose to generate a coupon in place of a feedback invitation, which is customarily offered as the default engagement to customers. In such example, the coupon is more suited for the frequent customer who may have already submitted many feedbacks.

Figure 5:
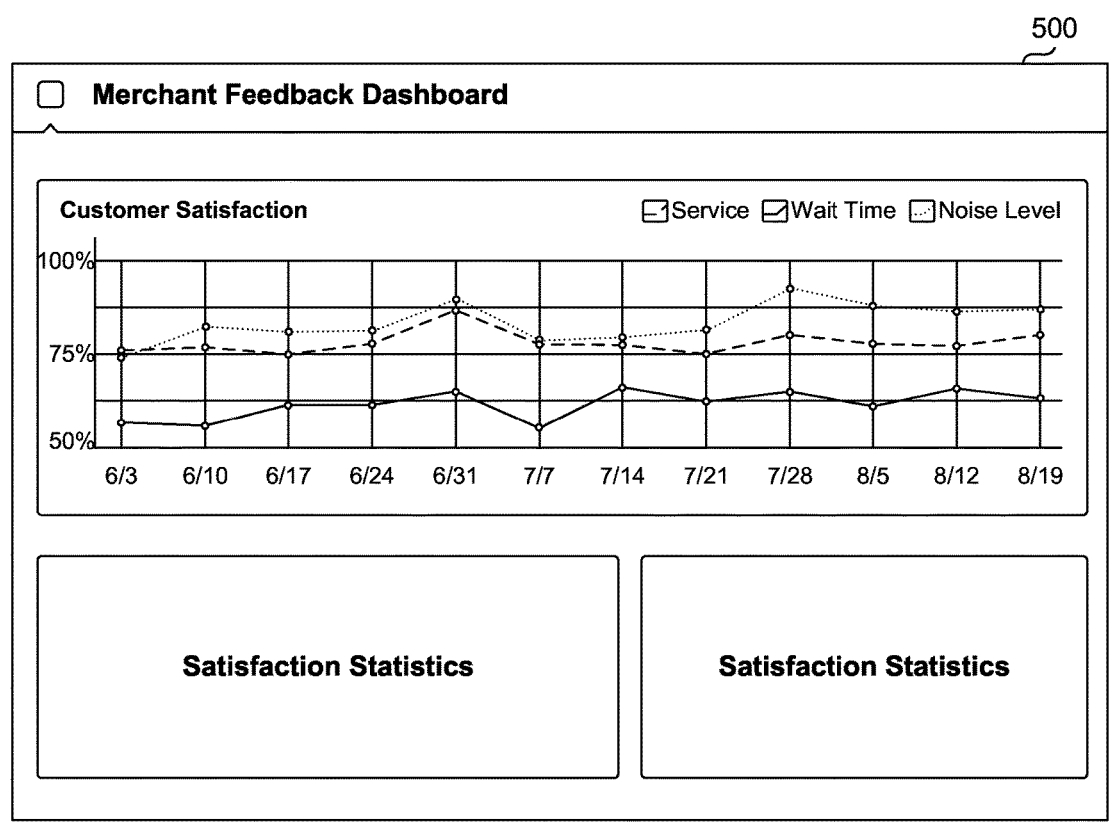
FIG. 5 illustrates a screenshot of a feedback dashboard for managing customer feedback.
Figure 6:
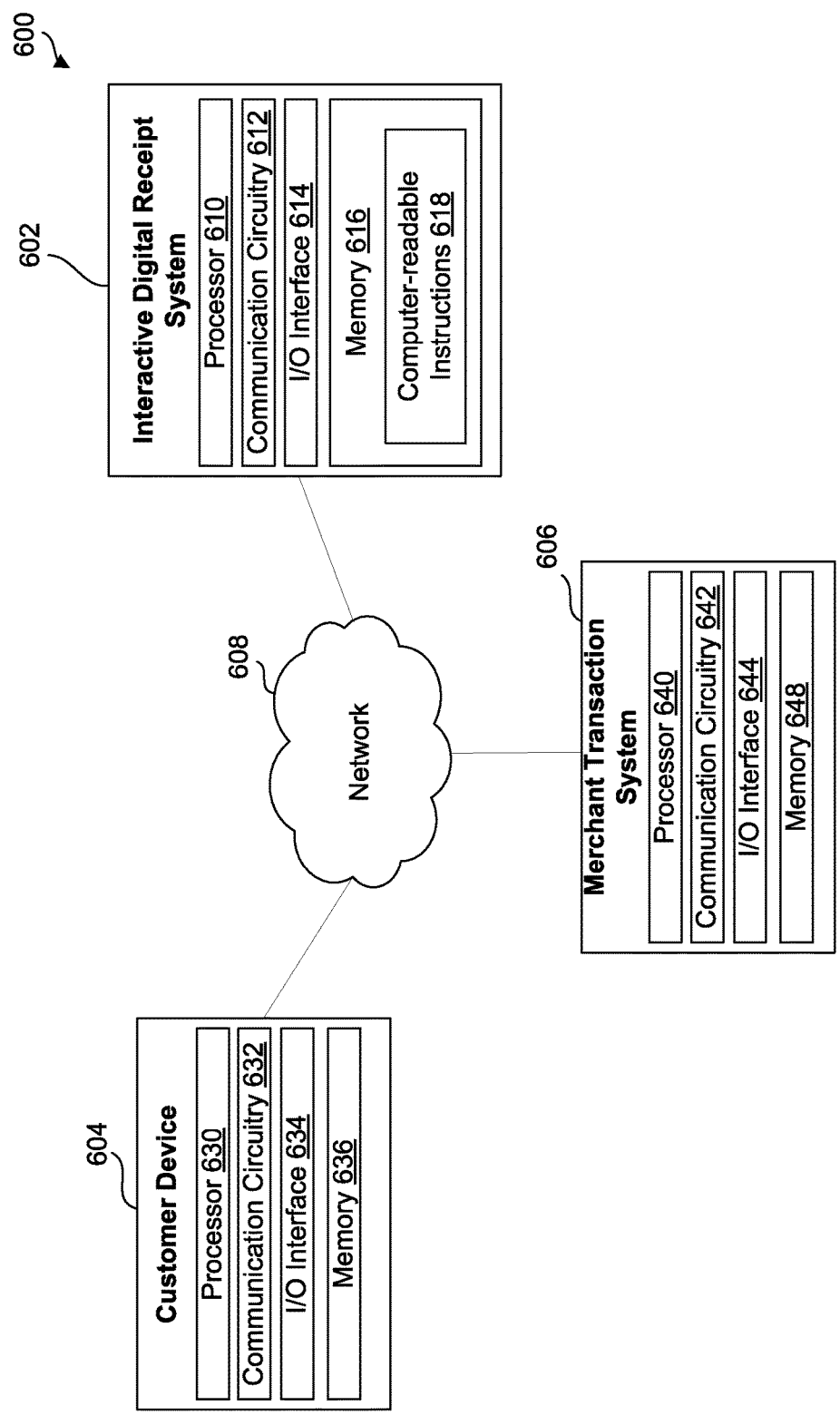
FIG. 6 illustrates an environment in which the techniques disclosed herein may be implemented.

FIG. 5 illustrates a screenshot of a merchant feedback dashboard 500 for managing customer feedback. merchant feedback dashboard 500 may be part of a user interface implemented on a merchant computing system, such as the merchant transaction system 606 of FIG. 6. The merchant feedback dashboard 500 is connected to an interactive digital receipt system (e.g., the system 602 of FIG. 6) that is configured to generate one or more interactive digital receipts on a user device of a customer. The merchant feedback dashboard 500 collects and analyzes data extracted from the feedback submitted through one or more interactive digital receipts. A particular merchant may utilize content from the feedback dashboard 500 to improve the merchant's business needs. For example, the feedback dashboard 500 may be integrated with the merchant engagement dashboard 400 to automatically generate appropriate engagements for the interactive digital receipts.

FIG. 6 illustrates an environment 600 in which the techniques disclosed herein may be implemented. The environment 600 includes an interactive digital receipt system 602, a customer device 604, and a merchant transaction system 606. As illustrated in FIG. 6, the interactive digital receipt system 602 is operatively coupled, via a network 608, to the customer device 604 and the merchant transaction system 606. In this way, the interactive digital receipt system 602 can send and receive information, to and from the merchant transaction system 606 and the customer device 604, to facilitate generating an interactive digital receipt for one or more financial transactions between the merchant and the customer. It is noted that FIG. 6 illustrates only one example of an embodiment of the environment 600, and it will be appreciated that in other embodiments, the environment may include more or fewer components and that the components may have a different configuration. Further, the various components shown in FIG. 6 may be implemented by using hardware, software, firmware or a combination thereof, including one or more signal processing and/or application specific integrated circuits.

Referring to FIG. 6, the network 608 may be a communication network based on certain communication protocols, such as TCP/IP protocol. Such network may include, but is not limited to, Internet, Intranet, wide area network (WAN), local area network (LAN), wireless network, Bluetooth, WiFi, and mobile communication network. The physical connections of the network and the communication protocols are well known to those of skill in the art.

The interactive digital receipt system 602 includes a processor 610, communications circuitry 612, an input/output interface 614, and a memory 616. These components may be coupled by one or more communication buses or other signal lines. It is noted that the system 602 can include more or fewer components.

The processor 610 includes one or more processors. The processor 610 is operatively coupled to the communication circuitry 612 and the memory 616. The processor 610 may include a digital signal processor, a microprocessor, and various analog-to-digital converters, digital-to-analog converters, and other support circuits and/or combinations thereof. The processor may be configured to execute computer/machine readable and executable instructions stored in the local memory 616 or in a remote device memory (not shown). Such instructions are implemented by the processor 610 to perform one or more functions described above. In performing such functions, the processor 610 uses the communication circuitry 612 to communicate with the network 608 and other devices on the network 608, such as the merchant transaction system 606 and the customer device 604.

The communications circuitry 612 includes RF circuitry and/or port for sending and receiving information. The RF circuitry permits transmission of information over a wireless link or network to one or more other devices and includes well-known circuitry for performing this function. For example, the RF circuitry may enable WiFi, cellular, Bluetooth, Bluetooth low energy, global positioning system (GPS), near field communication (NFC), or other types of long range or short range communication. The port permits transmission of information over a wired link. The communications circuitry may communicate, for example, with the merchant transaction system 606.

The memory 616 includes one or more memories. The one or more memories may be, for example, cache memory, main memory and secondary memory. The memory 616 includes computer-readable instructions 618, where the computer-readable instructions may be executed by the processor 610 to implement a mobile application on the customer device 604, such as an interactive digital receipt application. In some embodiments, the memory 616 may include data storage (not shown) for storing data created and/or used by to the interactive digital receipt application.

The customer device 604 may be, for example, mobile devices and computing devices that can communicate with the interactive digital receipt system 602 and the merchant transaction system 606 through the network 608. The customer device 604 can be the user device 100 of FIGS. 1A-1I. The customer device 604 includes a processor 630, communications circuitry 632, an input/output (I/O) interface 634, and a memory 636. These components may be coupled by one or more communication buses or other signal lines. It is noted that the device 604 can include more or fewer components.

The processor 630 includes one or more processors. The processor 630 is operatively coupled to the communication circuitry 632 and the memory 636. The processor 630 may include a digital signal processor, a microprocessor, and various analog-to-digital converters, digital-to-analog converters, and other support circuits and/or combinations thereof. The processor 630 may be configured to execute computer/machine readable and executable instructions stored in the local memory 636 or in a remote device memory (not shown). Such instructions are implemented by the processor 630 to perform one or more functions described above. In performing such functions, the processor 630 uses the communication circuitry 632 to communicate with the network 608 and other devices on the network 608, such as the interactive digital receipt system 602 and the merchant transaction system 606.

The communications circuitry 632 includes one or more mechanisms that enable the interactive digital receipt system 602, the customer device 604, and/or the merchant transaction system 606 to engage in communications over the network 608. The communications circuitry 632 may include RF circuitry and/or port for sending and receiving information. The RF circuitry permits transmission of information over a wireless link or network to one or more other devices and includes well-known circuitry for performing this function. The RF circuitry may enable WiFi, cellular, Bluetooth, Bluetooth low energy, global positioning system (GPS), near field communication (NFC), or other types of long range or short range communication. The port permits transmission of information over a wired link. The communications circuitry 632 can be configured, for example, to aid in the handling, receipt and transmission of secured financial data sent between two or more network devices, such as the interactive digital receipt system 602 and the customer device 604, and/or the interactive digital receipt system 602 and the merchant transaction system 606.

The I/O interface 634 includes one or more user input and output device interface mechanisms. The interface 634 may include a computer keyboard, touchpad, touchscreen, mouse, display device, and the corresponding physical ports and underlying supporting hardware and software to enable communications with other network devices in the system 600. Such communications include, but are not limited to, accepting user data input (e.g., authorization of payment) and providing output information to a user, programming and administering one or more functions to be executed by the corresponding device and the like.

The memory 636 includes one or more memories. The memory 636 may include, but are not limited to, cache memory, main memory and secondary memory. The memory 636 may include computer-readable instructions, where the computer-readable instructions may be executed by the processing system 630. In some embodiments, the memory 636 may include data storage (not shown) for storing data created and/or used by to the customer device 604.

The merchant transaction system 606 may be, for example, mobile devices and computing devices that can communicate with the interactive digital receipt system 602 and the customer device 604 through the network 608. The mobile devices include, but are not limited to, smartphones (e.g., Android®-enabled phones), personal digital assistants (PDAs), portable computers with wired or wireless wide-area-network and/or telecommunication capability such as tablet personal computers and "netbook" personal computers. The computing devices include, but are not limited to, personal computers, electronic point-of-sale cash registry machines, and electronic kiosks.

The merchant transaction system 606 includes a processor 640, communications circuitry 642, an input/output (I/O) interface 644, and a memory 646. These components may be coupled by one or more communication buses or other signal lines. It is noted that the system 606 can include more or fewer components.

The processor 640 includes one or more processors. The processor 640 is operatively coupled to the communication circuitry 642 and the memory 648. The one or more processors may include a digital signal processor, a microprocessor, and various analog-to-digital converters, digital-to-analog converters, and other support circuits and/or combinations thereof. The processor 640 may be configured to execute computer/machine readable and executable instructions stored in the local memory 648 or in a remote device memory (not shown). Such instructions are implemented by the processor 630 to perform one or more functions described above. In performing such functions, the processor 640 uses the communication circuitry 642 to communicate with the network 608 and other devices on the network 608, such as the interactive digital receipt system 602 and the customer device 604.

The communications circuitry 642 includes one or more mechanisms that enable the interactive digital receipt system 602, the customer device 604, and/or the merchant transaction system 606 to engage in communications over the network 608. The communications circuitry 642 may include RF circuitry and/or port for sending and receiving information. The RF circuitry permits transmission of information over a wireless link or network to one or more other devices and includes well-known circuitry for performing this function. The RF circuitry may enable WiFi, cellular, Bluetooth, Bluetooth low energy, global positioning system (GPS), near field communication (NFC), or other types of long range or short range communication. The port permits transmission of information over a wired link. The communications circuitry 642 can be configured, for example, to aid in the handling, receipt and transmission of secured financial data sent between two or more network devices, such as the merchant transaction system 606 and the customer device 604, and/or the merchant transaction system 606 the interactive digital receipt system 602.

The I/O interface 644 includes one or more user input and output device interface mechanisms. The interface may include a computer keyboard, touchpad, touchscreen, mouse, display device, and the corresponding physical ports and underlying supporting hardware and software to enable communications with other network devices in the system 600. Such communications include, but are not limited to, accepting user data input (e.g., credit card payment data via a POS device) and providing output information (e.g., communicating with the receipt system 602 to deliver an interactive digital receipt) to a user (e.g., user of the customer device 604), programming and administering one or more functions to be executed by the corresponding device and the like.

The memory 648 includes one or more memories. The one or more memories may be, for example, cache memory, main memory and secondary memory. The memory 648 includes computer-readable instructions, where the computer-readable instructions may be executed by the processor 640. In some embodiments, the memory 648 may include data storage (not shown) for storing data related to the financial transaction between the customer and the merchant.

What is claimed is:

1. A method of providing an interactive digital receipt, comprising:
   receiving, by an interactive digital receipt system and from a first mobile device associated with a merchant, an indication of a payment transaction between a customer and the merchant instantiated on the first mobile device;
   generating, by the interactive digital receipt system as part of the payment transaction, an interactive digital receipt that includes an indication of a payment amount associated with the payment transaction and an interactive promotion component for redeeming a promotional reward;
   transmitting, by the interactive digital receipt system and to a second mobile device associated with the customer, the interactive digital receipt;
   receiving, by the second mobile device and from the interactive digital receipt system, the interactive digital receipt;
   presenting, at the second mobile device, the interactive digital receipt;
   enabling, by the interactive digital receipt at the second mobile device, the interaction promotion component for a promotion timeframe that defines a time period during which input to the interactive promotion component to redeem the promotional reward is effective;
   receiving, by the interactive digital receipt system and from the second mobile device, an interactive input submitted by the customer within the promotion timeframe to redeem the promotional reward;
   disabling, by the interactive digital receipt at the second mobile device after the end of the promotion timeframe, the interaction promotion component; and
   processing, by the interactive digital receipt system, the interactive input to generate the promotional reward, wherein the promotional reward is configured to decrease in value based on a time of submission of the interactive input with respect to the promotion timeframe, the promotional reward having at least a first value at a first time and a second value at a second time, wherein the first time and the second time are before the expiration of the promotion timeframe and the first value is different from the second value.

2. The method of claim 1, wherein the interactive input includes at least one of: participation in an interactive game associated with the merchant; completion of an activity associated with the merchant; or completion of an activity associated with a third party associated with the merchant.

3. The method of claim 1, wherein the promotional reward is configured to decrease in value at a rate configured by the merchant.

4. The method of claim 1, wherein the interactive digital receipt further includes an interactive feedback component for the customer to submit feedback associated with the payment transaction, wherein the interactive feedback component remains available for a feedback timeframe that defines a particular time period for the customer to submit the feedback using the interactive feedback component.

5. The method of claim 1, wherein the interactive digital receipt further includes an interactive loyalty rewards component for the customer to maintain a rewards record of purchases from a plurality of payment transactions over a span of time.

6. The method of claim 4, wherein the interactive feedback component is configured to generate a time-based reward for submission of the feedback, wherein a value of the time-based reward is defined based on a time of submission of the feedback.

7. The method of claim 1, wherein the interactive digital receipt includes an interactive tipping component that enables the customer to submit a gratuity amount associated with the payment transaction subsequent to the interactive digital receipt being transmitted to the customer, the interactive tipping component remaining available for a gratuity timeframe that defines a time period for the customer to submit the gratuity amount using the interactive tipping component.

8. The method of claim 1, further comprising:
generating for the customer an interactive transaction record that is accessible via the interactive digital receipt, the interactive transaction record comprising a plurality of transaction records completed between the customer and the merchant; and
for each new financial transaction between the customer and the merchant, updating the interactive transaction record.

9. A non-transitory computer-readable storage medium storing instructions that, when executed by a computing system, cause the computing system to perform operations for providing an interactive digital receipt, the operations comprising:
receiving, from a first mobile device associated with a merchant, an indication of a payment transaction between a customer and the merchant, the payment transaction being instantiated on the first mobile device;
generating, as part of the payment transaction, an interactive digital receipt that includes an indication of a payment amount associated with the payment transaction and an interactive promotion portion for redeeming a promotional reward, the interactive digital receipt configured to enable the interactive promotion portion at a second mobile device associated with the customer for a promotion timeframe that defines a time period during which input to the interactive promotion component to redeem the promotional reward via the interactive promotion portion is effective;
transmitting, to the second mobile device, the interactive digital receipt;
receiving, from the second mobile device, an interactive input submitted within the promotion timeframe by the customer to redeem the promotional reward; and
processing the interactive input to generate the promotional reward, wherein the promotional reward is configured to decrease in value based on a time of submission of the interactive input with respect to the promotion timeframe, the promotional reward having at least a first value at a first time and a second value at a second time, wherein the first time and the second time are before the expiration of the promotion timeframe and the first value is different from the second value.

10. The non-transitory computer-readable storage medium of claim 9, wherein the interactive input includes at least one of: participation in an interactive game associated with the merchant; completion of an activity associated with the merchant; or completion of an activity associated with a third party associated with the merchant.

11. The non-transitory computer-readable storage medium of claim 9, wherein the promotional reward is configured to decrease in value at a rate configured by the merchant.

12. The non-transitory computer-readable storage medium of claim 9, wherein the interactive digital receipt further includes an interactive feedback portion enabling the customer to submit feedback associated with the payment transaction, wherein the interactive feedback portion remains available for a feedback timeframe that defines a particular time period for the customer to submit the feedback using the interactive feedback portion.

13. The non-transitory computer-readable storage medium of claim 12, wherein the interactive feedback portion is configured to generate a time-based reward for submission of the feedback, wherein a value of the time-based reward is defined based on a time of submission of the feedback.

14. The non-transitory computer-readable storage medium of claim 9, wherein the interactive digital receipt further includes an interactive loyalty rewards portion for the customer to maintain a rewards record of purchases from a plurality of payment transactions over a span of time.

15. The non-transitory computer-readable storage medium of claim 9, wherein the interactive digital receipt includes an interactive tipping portion that enables the customer to submit a gratuity amount associated with the payment transaction subsequent to the interactive digital receipt being transmitted to the customer, the interactive tipping portion remaining available for a gratuity timeframe that defines a time period for the customer to submit the gratuity amount using the interactive tipping portion.

16. The non-transitory computer-readable storage medium of claim 9, wherein the operations further comprise:
generating for the customer an interactive transaction record that is accessible via the interactive digital receipt, the interactive transaction record comprising a plurality of transaction records completed between the customer and the merchant; and
for each new financial transaction between the customer and the merchant, updating the interactive transaction record.

17. A computing system comprising:
a memory;
one or more processors coupled to the memory;
wherein the memory contains first executable code that when executed by the one or more processors, performs operations including:
receive an indication of a payment transaction between a customer and a merchant;

generate, as part of the payment transaction, an interactive digital receipt that includes an indication of a payment amount associated with the payment transaction and an interactive promotion portion for redeeming a promotional reward, wherein the interactive digital receipt generates instructions that, when executed by one or more processors of a customer device, enable the interactive promotion portion on the customer device for a promotion timeframe that defines a time period during which input to the interactive promotion component to redeem the promotional reward via the interactive promotion portion is effective;

transmit the interactive digital receipt to the customer device;

receive, from the customer device, an interactive input submitted by the customer within the promotion timeframe to redeem the promotional reward; and process the interactive input to generate the promotional reward, wherein the promotional reward is configured to decrease in value based on a time of submission of the interactive input with respect to the promotion timeframe, the promotional reward having at least a first value at a first time and a second value at a second time, wherein the first time and the second time are before the expiration of the promotion timeframe and the first value is different from the second value.

18. The system of claim 17, wherein the interactive digital receipt further includes an interactive feedback portion enabling the customer to submit feedback associated with the payment transaction, wherein the interactive feedback portion remains available for a feedback timeframe that defines a particular time period for the customer to submit the feedback using the interactive feedback portion.

19. The system of claim 18, wherein the interactive feedback portion is configured to generate a time-based reward for submission of the feedback, wherein a value of the time-based reward is defined based on a time of submission of the feedback.

20. The system of claim 17, wherein the interactive receipt module is further configured to:

generate for the customer an interactive transaction record that is accessible via the interactive digital receipt, the interactive transaction record comprising a plurality of transaction records completed between the customer and the merchant; and for each new financial transaction between the customer and the merchant, update the interactive transaction record.

* * * * *